US012450646B2

United States Patent
Ghoshal et al.

(10) Patent No.: US 12,450,646 B2
(45) Date of Patent: Oct. 21, 2025

(54) SYSTEM AND METHOD FOR CONTENT CREATION TOOL FOR USE WITH SHOPPABLE CONTENT DATA

(71) Applicant: ORACLE INTERNATIONAL CORPORATION, Redwood Shores, CA (US)

(72) Inventors: Sandip Ghoshal, Bengaluru (IN); Vinod Kandukuri, Bengaluru (IN); Vivek Peter, Bengaluru (IN); Hareesh S. Kadlabalu, Plainview, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 811 days.

(21) Appl. No.: 16/936,362

(22) Filed: Jul. 22, 2020

(65) Prior Publication Data

US 2020/0349635 A1 Nov. 5, 2020

Related U.S. Application Data

(63) Continuation-in-part of application No. 16/657,052, filed on Oct. 18, 2019, now Pat. No. 11,481,467.
(Continued)

(51) Int. Cl.
*G06Q 30/0601* (2023.01)
*G06V 20/20* (2022.01)
*H04N 21/854* (2011.01)

(52) U.S. Cl.
CPC ..... *G06Q 30/0643* (2013.01); *G06Q 30/0625* (2013.01); *G06V 20/20* (2022.01); *H04N 21/854* (2013.01)

(58) Field of Classification Search
CPC ......... G06Q 30/06–0645; G06Q 30/08; G06Q 50/01; G06V 20/20; G06V 2201/07; H04N 21/854; G16Y 10/00–90
See application file for complete search history.

(56) References Cited

U.S. PATENT DOCUMENTS 9,292,866 B2 3/2016 Allaire
10,248,982 B2 * 4/2019 Gonzales, Jr. ..... G06Q 30/0623
(Continued)

OTHER PUBLICATIONS

Adobe, "Adobe Experience Manager Sites Features", Adobe Experience Manager Sites, retrieved from https://www.adobe.com/marketing/experience-manager-sites/features.html on Jan. 14, 2019, 5 pages.
(Continued)

*Primary Examiner* — Adam L Levine
(74) *Attorney, Agent, or Firm* — TUCKER ELLIS LLP

(57) ABSTRACT

In accordance with an embodiment, described herein is a system and method for providing a content creation tool for use with shoppable content data. A content management system, such as, for example, an Oracle Content and Experience Cloud (OCE) environment, enables the creation of shoppable content that provides a purchasing opportunity directly from the content itself. The system can include, support, or operate in accordance with a content creation tool, that can incorporate aspects of artificial intelligence, for use with shoppable content data, including, for example, performing automatic detection of objects in an image; and automatic discovery of products to be mapped with the shoppable objects or shoppable content; for use in publishing the shoppable content in mobile application, web, or other document formats.

18 Claims, 21 Drawing Sheets

Related U.S. Application Data

(60) Provisional application No. 62/748,173, filed on Oct. 19, 2018, provisional application No. 62/748,144, filed on Oct. 19, 2018.

(56) References Cited

U.S. PATENT DOCUMENTS

| | | | |
|---|---|---|---|
| 10,354,290 B2* | 7/2019 | Yadav | G11B 27/034 |
| 10,529,008 B1 | 1/2020 | Pritchard et al. | |
| 11,532,036 B2* | 12/2022 | Kumar | G06Q 30/0643 |
| 2007/0088629 A1 | 4/2007 | Hodson et al. | |
| 2010/0106565 A1 | 4/2010 | Manesh et al. | |
| 2011/0166918 A1 | 7/2011 | Allaire | |
| 2011/0191206 A1 | 8/2011 | Kiarostami | |
| 2013/0151417 A1 | 6/2013 | Gupta | |
| 2014/0129959 A1* | 5/2014 | Battles | G06Q 30/0251 |
| | | | 715/765 |
| 2014/0222553 A1 | 8/2014 | Bowman | |
| 2015/0019944 A1 | 1/2015 | Kalgi | |
| 2015/0186391 A1 | 7/2015 | Pitt | |
| 2015/0302482 A1* | 10/2015 | Vagner | G06Q 30/0269 |
| | | | 705/14.66 |
| 2016/0027067 A1* | 1/2016 | Zindler | H04N 21/4725 |
| | | | 705/14.72 |
| 2016/0092967 A1 | 3/2016 | Akbarpour et al. | |
| 2016/0180427 A1* | 6/2016 | Gonzales, Jr. | G06Q 30/0623 |
| | | | 705/26.61 |
| 2016/0225053 A1* | 8/2016 | Romley | G06T 7/143 |
| 2017/0011441 A1 | 1/2017 | Buezas et al. | |
| 2017/0235776 A1 | 8/2017 | Stasior et al. | |
| 2017/0287056 A1* | 10/2017 | Dohlman | G06F 16/5838 |
| 2019/0286689 A1 | 9/2019 | Perkins et al. | |
| 2020/0359210 A1 | 11/2020 | Akkad et al. | |
| 2020/0412790 A1* | 12/2020 | Jain | G06Q 30/0643 |
| 2021/0004881 A1 | 1/2021 | Bifolco et al. | |
| 2021/0312120 A1* | 10/2021 | Martin | G06F 40/143 |
| 2021/0406975 A1* | 12/2021 | Chung | G06Q 30/0627 |

OTHER PUBLICATIONS

Adobe, "Commerce integration: Enable transactions with e-commerce integrations", Adobe Experience Manager Sites, retrieved from https://www.adobe.com/marketing/experience-manager-sites/ecommerce-integrations.html on Jan. 14, 2019, 4 pages.

Drupal, "Ubercart", published on Mar. 19, 2007, retrieved from https://www.drupal.org/project/ubercart on Jan. 11, 2019, 3 pages.

Gibson, Jill Finger; "Content Publishers Underestimate the 'Shoppable Content' Challenge", Digital Clarity Group, published on May 11, 2016, retrieved from http://www.digitalclaritygroup.com/shoppable-content-challenge/ on Jan. 10, 2019, 2 pages.

ICart, "free jQuery/PHP web cart: Learn how to install a free PHP shopping cart on your website", retrieved from http://conceptlogic.com/jcart/install.php on Jan. 11, 2019, 4 pages.

Macarthy, Andrew; "How to Setup Buyable Pins to Sell Products Direct on Pinterest", retrieved from http://andrewmacarthy.com/adnrew-macarthy-social-media/setup-buyable-pins-pinterest-for-business on Jan. 16, 2019, 8 pages.

Pathak, Abhinav; "E-Commerce Solutions and Third-Party Integration Options within Drupal Ecosystem", Valuebound, published May 9, 2018, retrieved from https://www.valuebound.com/resources/blog/e-commerce-solutions-and-third-party-integration-options-within-drupal-ecosystem on Feb. 7, 2020, 2 pages.

Pathak, Abhinav; "E-Commerce Solutions and Third-Party Integration Options within Drupal Ecosystem", Valuebound, published May 9, 2018, 5 pages.

Smith, Justin; "A Comprehensive List of Must-Have Ecommerce Website Features", Outerbox, published Feb. 15, 2018, retrieved from https://www.outerboxdesign.com/web-design-articles/ecommerce_features on Jan. 10, 2019, 7 pages.

Smith, Justin; "eCommerce Content Management Systems For Your e-Commerce Website", Outerbox, retrieved from https://www.outerboxdesign.com/web-design-articles/managing_ecommerce on Jan. 10, 2019, 1 page.

Stack Overflow, "How to integrate e-commerce or shopping cart into website without using a template?", retrieved from https://stackoverflow.com/questions/5696315/how-to-integrate-e-commerce-or-shopping-cart-into-website-without-using-a-template on Jan. 11, 2019, 8 pages.

United States Patent and Trademark Office, Office Action mailed Feb. 3, 2021 for U.S. Appl. No. 16/657,052, 26 pages.

United States Patent and Trademark Office, Notice of Allowance and Fee(s) Due dated Jun. 13, 2022 for U.S. Appl. No. 16/657,052, 17 pages.

* cited by examiner

```
{
  "id": "CORE38B9359A26474900BC39954AE2EDAA30",
  "type": "Article",
  "name": "A great cure for all troubles...",
  "description": "A great cure for all troubles...",
  "language": "en-US",
  "translatable": true,
  "createdBy": "swebcli.StesAdmin1.admin",
  "createdDate": {
    "value": "2018-08-07T16:25:32.607Z",
    "timezone": "UTC"
  },
  "updatedBy": "swebcli.StesAdmin1.admin",
  "updatedDate": {
    "value": "2018-08-07T16:35:17.881Z",
    "timezone": "UTC"
  },
```

Standard Asset Data
501

```
  "fields": {
    "title": "Love planted a rose, and the world turn swet.",
    "summary": "summary text",
    "body": "body text"
  },
```

Custom Fields and Data
(Persuasive Content)
502

```
  "product": {
    "id": 144661410621 0,
    "title": "Snake Boil Brew",
    "body_html": "A brew to help if the hangover is gone too soon!",
    "vendor": "SnakeOilsRUs",
    "product_type": "",
    "handle": "snake-boil-brew",
    "tags": "",
    "inventoryInfo": "https://.../i.inventory?i.d=abc",
    "pricingInfo": "https://.../pri.ci.ng?i.d=abc",
    "published_scope": "web",
    "variants": [...],
    "options": [...],
    "images": [...],
    "image": {...}
  }
}
```

Product Details
503

*FIGURE 5*

SYSTEM AND METHOD FOR CONTENT CREATION TOOL FOR USE WITH SHOPPABLE CONTENT DATA

CLAIM OF PRIORITY

This application is a continuation in part of, and claims the benefit of priority to, U.S. Patent Application titled "SYSTEM AND METHOD FOR MANAGEMENT AND DELIVERY OF SHOPPABLE CONTENT DATA", Application Ser. No. 16/657,052, filed Oct. 18, 2019; which application claims the benefit of priority to U.S. Provisional Patent Application titled "SYSTEM AND METHOD FOR MANAGEMENT AND DELIVERY OF SHOPPABLE CONTENT DATA", Application No. 62/748,173, filed Oct. 19, 2018; and U.S. Provisional Patent Application titled "SYSTEM AND METHOD FOR GENERATION OF STARTER WEBSITES FOR USE WITH ONLINE COMMERCE ENVIRONMENTS", Application No. 62/748,144, filed Oct. 19, 2018; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF TECHNOLOGY

This application is generally related to online commerce environments, and management and delivery of shoppable content data, and is particularly related to a system and method for providing an object detection system or content creation tool for use with shoppable content data.

BACKGROUND

A content management system, for use with online commerce environments, generally allows users to collaboratively manage digital content, such as, for example, web content, for display on websites, or on mobile device apps, or other platforms. Such systems enable the development of content associated with products that are available for purchase from a commerce provider. Traditionally the development of web documents (e.g., sites or applications) associated with such content has been performed manually by content creators who mark suitable objects present in an image, and then attach or link an appropriate ecommerce product to the marked objects. However, such a process can be error prone and time consuming, particularly when a single image may include multiple objects.

SUMMARY

In accordance with an embodiment, described herein is a system and method for providing a content creation tool for use with shoppable content data. A content management system, such as, for example, an Oracle Content and Experience Cloud (OCE) environment, enables the creation of shoppable content that provides a purchasing opportunity directly from the content itself. The system can include, support, or operate in accordance with a content creation tool, that can incorporate aspects of artificial intelligence, for use with shoppable content data, including, for example, performing automatic detection of objects in an image; and automatic discovery of products to be mapped with the shoppable objects or shoppable content; for use in publishing the shoppable content in mobile application, web, or other document formats.

BRIEF DESCRIPTION OF THE DRAWINGS

FIG. 5 depicts exemplary attributes that can be defined for a product field object, in accordance with an embodiment.

DETAILED DESCRIPTION

Figure 1:
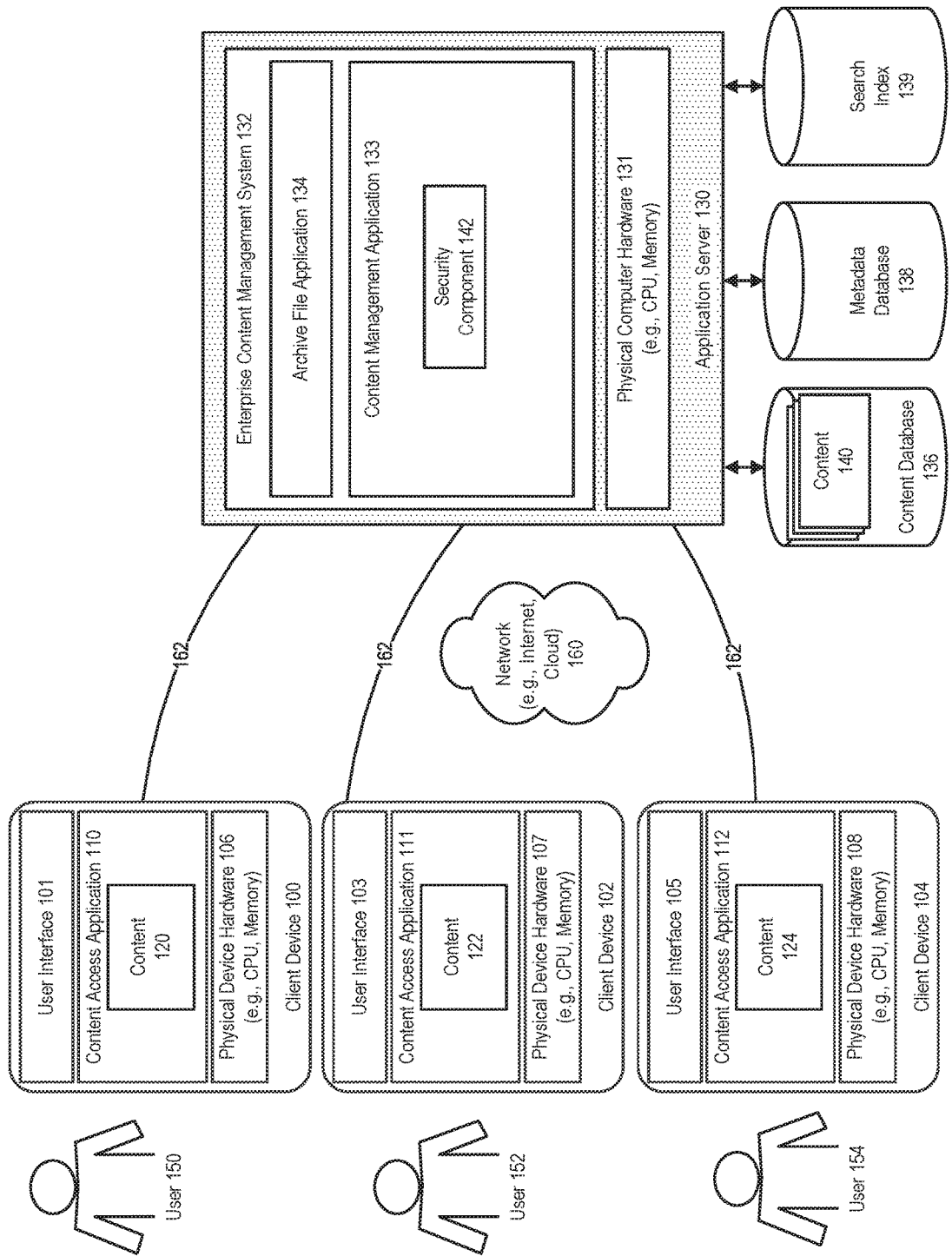
FIG. 1 illustrates a system for management and delivery of shoppable content data, in accordance with an embodiment.

In accordance with an embodiment, the invention is illustrated by way of example and not by way of limitation in the figures of the accompanying drawings, in which like references indicate similar elements. It should be noted that references to "an" or "one" or "some" embodiment(s) in this disclosure are not necessarily referencing the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

In accordance with an embodiment, shoppable content includes content (e.g., videos, articles, images, etc.) that provides a purchasing opportunity directly from the content itself. Shoppable content can allow consumers to either add products directly to a cart of a commerce provider, e.g., online retailer, from the content they are viewing, or be taken to a product page of an online retailer from where the consumer can continue to shop. Shoppable content offers a more seamless and transparent purchasing experience for web-based consumers.

One problem associated with shoppable content is the complexity of the programming behind the features associated with it. In order to obtain online goods from conventional commerce provider systems (e.g., a website powered by the Shopify commerce provider system), consumers would browse to webpages that were purpose-built for selecting and purchasing content available from the retailer.

The concept of shoppable content, however, allows a selection, online cart placement, and in some cases purchase, of a sale item from a web document that, traditionally, is not designed to handle such commerce provider system tasks.

Generally, the development, including coding, of web documents enabled with shoppable content (such as, for example blogs, storyboards, etc.) has been done manually by developers experienced with the markup language and low-level coding languages that are capable of producing these sophisticated features.

More people, however, are turning to systems and platforms that support rapid development and deployment of web-based content. Many of these systems (e.g., content management systems that include automated web document development platforms) automatically generate the underlying markup language and code needed to display a web document, which bypasses the manual coding of the document by a human developer.

Another consideration associated with building shoppable content is the interest in easily managing user-engagement content (such as, for example marketing literature, a blog or another form of persuasive content) with shoppable products. Typically, due to differing levels of sophistication and focus of tooling, traditional commerce systems do a poor job of managing engagement content; while traditional content management systems do a poor job of managing shoppable products.

As a result, much of the detailed work associated with making shoppable content realized in a web site, or mobile application (app), is left to the developer to address, often through data modeling and associated programming.

In accordance with an embodiment, the system described herein addresses inadequacies in conventional content management systems and automated web document development platforms, by providing the ability for such applications to generate sophisticated and robust markup language and code that enables shoppable content in web documents.

In accordance with an embodiment, the system provides, for example:
(1) A data modeling environment that incorporates shoppable content, residing in any commerce solution, into a content model.
(2) A client application program interface (API) contract that establishes how a client (e.g., a web site, or mobile application (app)) can understand and work with shoppable content, in combination with marketing content.
(3) A server application program interface (API) contract (admin API contract) that establishes interactions between a content management system (CMS) and a commerce provider system (commerce provider).
(4) A set of pre-built components that present the shopping experience to an end user.

Content Management System

In accordance with an embodiment, content management systems and automated web document development platforms (CMSs) are applications that allow users to collaboratively manage digital content, including web content. An exemplary content management system is Oracle Content and Experience Cloud (OCE). OCE is a content management service offered from and accessed through cloud services.

In accordance with an embodiment, content management systems provided various features. These features can include, but are not limited to, creating, storing, administering, and publishing associated digital content. CMSs, such as, for example Oracle OCE, allow rapid development and publishing of content across multiple delivery channels via automated web document development modules.

In accordance with an embodiment, a delivery channel can be any form in which content is delivered to a consumer of the content. Exemplary delivery channels include websites, blogs, HTML emails, story boards, mobile applications, etc. In order to provide rapid development of the documents used by associated deliver channels, an automated web document development module of a CMS can include features such as, for example out-of-the-box templates, drag-and-drop components, sample page layouts, and site themes, which allow a user to assemble content into a publishable document from predefined building blocks. A conventional CMS uses these components to generate the markup language and code (referred to herein collectively as the "code") of the document.

FIG. 1 illustrates a system for management and delivery of shoppable content data, in accordance with an embodiment. More specifically, FIG. 1 illustrates an exemplary content management system which can be used in the management and delivery of shoppable content data.

As illustrated in FIG. 1, in accordance with an embodiment, for each of a plurality of client devices 100, 102, and 104 having a user interface 101, 103, 105 and physical device hardware 106, 107, 108 (e.g., CPU, memory), the client device can be provided with a content access application 110, 111, 112 for execution thereon.

In accordance with an embodiment, the client device can communicate 162 with an application server 130 that includes a physical computer hardware 131 (e.g. CPU, memory) and an enterprise content management system 132.

In accordance with an embodiment, the content access application at the client device can communicate with the enterprise content management system via a network 160 (e.g., the Internet, or a cloud environment). The content access application can be configured to enable a user 150, 152, 154 to view, upload, modify, delete, or otherwise access content such as, for example content items 120, 122, 124 at each client device. For example, new content can be added or uploaded to the enterprise content management system by a user interacting with the content access application on an associated client device. The content can be transmitted to the enterprise content management system for storage.

In accordance with an embodiment, the content management system can be or include a platform for consolidating content that can be managed by a number of users or clients. In accordance with an embodiment, the content management system can be configured to communicate with a content database 136 for storing content (or content items) 140, and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles.

In accordance with an embodiment, the enterprise content management system can be configured to associate metadata with the content. Metadata can include information about an item of content, such as, for example its title, author, release date, historical data such as, for example who has accessed the item and when, a location where the content is stored, and the like.

In accordance with an embodiment, the metadata can be stored in a metadata database 138. In accordance with an embodiment, the enterprise content management system can be configured to communicate with the metadata database to access metadata stored therein, and to store metadata generated by the system in the metadata database.

In accordance with an embodiment, the content management system can also be configured to communicate with a search index 139. The search index can be configured to provide indexing and searching of content and data stored in the content database and the metadata database. In accordance with an embodiment, the search index can be a relational database management system (RDBMS) or a search tool such as, for example Oracle Secure Enterprise Search (Oracle SES).

In accordance with an embodiment, the enterprise content management system can further include a content management application 133 including a security component 142. The security component can include or store a security data including user permissions and privileges with respect to particular items of content and/or particular actions. For example, the security data can indicate that certain users are permitted to access and/or modify certain documents. As another example, the security data can indicate that only certain users are permitted to create links between content items, to modify certain content items, or to delete content items.

Management and Delivery of Shoppable Content

In accordance with an embodiment, the systems and methods described herein can provide a data modeling environment that incorporates shoppable content, residing in any commerce solution, into a content model. In addition, the systems and methods utilize a client application program interface (API) contract that establishes how a client (e.g., a web site, or mobile application (app)) can understand and work with shoppable content, in combination with marketing content.

In accordance with an embodiment, a server application program interface (API) contract (admin API contract) can be provided that establishes interactions between a content management system (CMS) and a commerce provider system (commerce provider).

In accordance with an embodiment, a set of pre-built components that present the shopping experience to an end user can additionally be provided.

In accordance with an embodiment, the content management system provides a modeled content architecture that can include content-type objects that represent types of content; and product-field objects that represent types of fields that can be added to a content model.

In accordance with an embodiment, the server API contract operates as a contract between the content management system and the commerce provider, for example an online retailer, and enables communication and data exchange between the content management system and the commerce provider.

For example, in an embodiment, an account at the commerce provider can be associated with a set of products retailed by that commerce provider. A list of the products can be received, via the server API contract, at the content management system, which can generate a product-field object for each product in the list of products, include receiving, from the online retailer, values to the attributes of the product-field object.

In accordance with an embodiment, the content management system can generate machine-readable code based on a content-type object that incorporates the product-field object, which can then be used in displaying an online or publishable content, including interactive features based on the attributes of the product-field object.

Based on an interaction with the interactive features, in accordance with an embodiment, data and other metrics associated with the product can be retrieved from the commerce provider; or data associated with a request can be sent to the commerce provider, to perform an action associated with the product.

Figure 2:
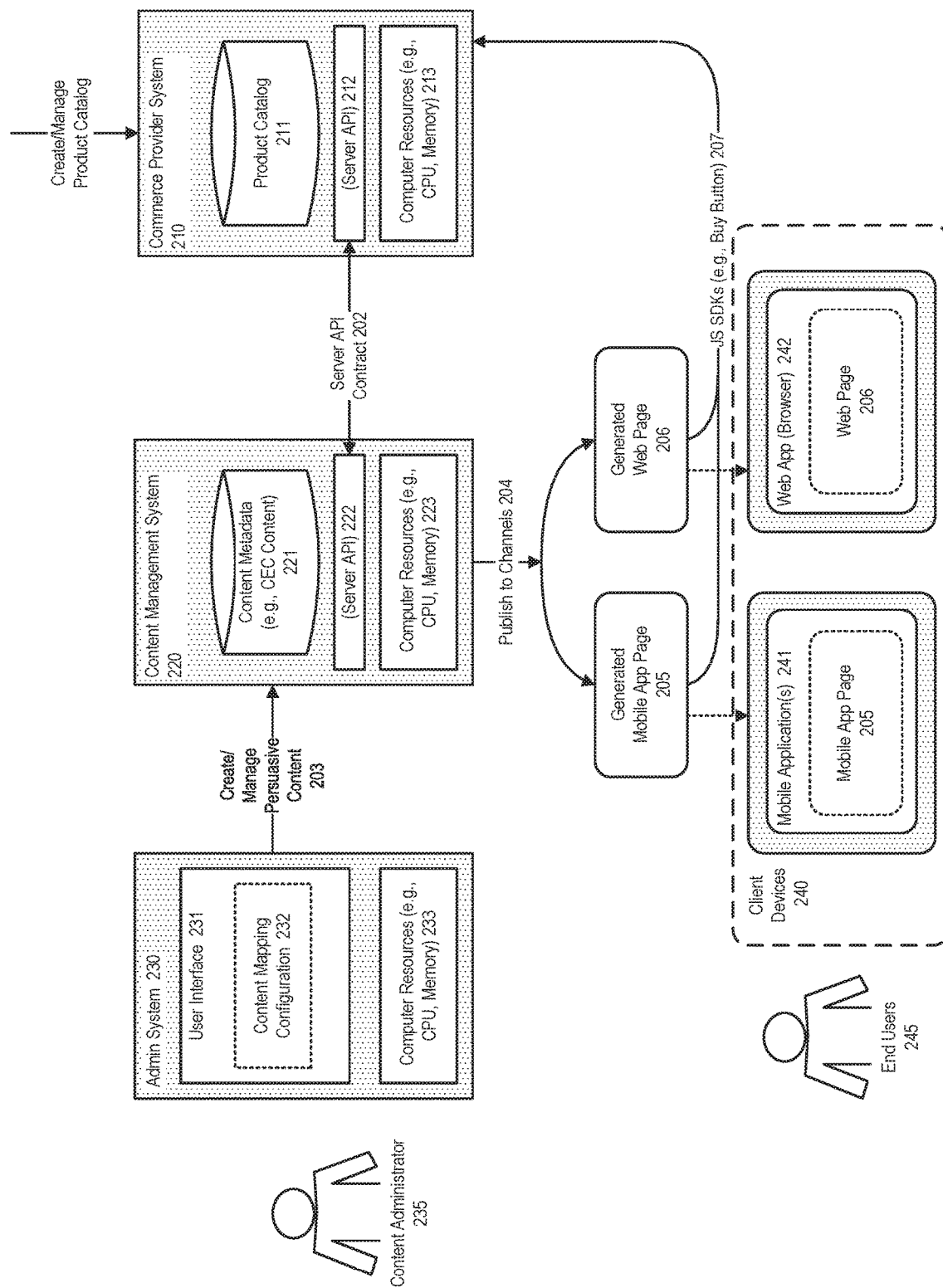
FIG. 2 illustrates an exemplary content management system environment, in accordance with an embodiment.

FIG. 2 illustrates an exemplary content management system environment, in accordance with an embodiment.

In accordance with an embodiment, a commerce provider system 210 can be provided in a system to manage and deliver shoppable content data. The commerce provider system (e.g., Shopify) can comprise a product catalog 211, an API, such as, for example server API 212, as well as physical computer resources, such as, for example CPU, memory 213.

In accordance with an embodiment, a content management system (e.g. OCE) 220 can be provided in a system to manage and deliver shoppable content data. The content management system can comprise a content metadata database 221 (e.g., OCE Content and Metadata databases), an API, such as, for example server API 222, as well as physical computer resources, such as, for example CPU, memory 223.

In accordance with an embodiment, a content administrator 235 can interact with an admin system 230 in such a system to create/manage and delivery shoppable content data 203. The admin system can comprise or provide a user interface 231, which can comprise or provide a content mapping configuration 232. The admin system can also comprise physical computer resources, such as, for example CPU, memory, 233.

In accordance with an embodiment, as illustrated in FIG. 2, a server API contract (admin API contract) 202 can operate as a contract between the content management system (CMS) 220, and an online retailer's web site and/or backend applications, generally referred to herein as a commerce provider 210.

For example, the server API contract can be configured to receive account information and credentials that are associated with a user account at the commerce provider.

In accordance with an embodiment, the content management system can use the received account credentials to authenticate an administrative user (e.g., content administrator 235) of the content management system, at the commerce provider system 210, via the server API (admin API); which provides access by the content management system to data stored at the commerce provider system.

For example, the content management system can request, via the server API, that the commerce provider send data describing/defining a set of products offered for sale by the commerce provider. The commerce provider system can then send such data to the content management system via the server API 202. This data can include, for example, a list of products, along with the data describing the list of products.

In accordance with an embodiment, the server API contract can define which types of data should be made available by the commerce provider in order to fulfil the contract defined by the server API contract; and which types of data can optionally be provided by the commerce provider. For example, the server API contract can specify that certain attribute values for products are to be supplied in an API call from the content management system to the commerce provider, while other types of data can be excluded from such calls.

As described below and illustrated in FIGS. 3 and 4, a content-type object can represent a type of document that an administrative user wishes to create (e.g., a web page, blog, HTML email, story board, mobile application (app) page, or other type of document). A product-field object can represent a type of field that can be added to a content type, and can be a child object of the content-type object. The product-field object can define a number of attributes of a product. These attributes of the product-field object can reflect the attributes defined in the server API contract; and can be populated with values supplied from the commerce provider via the server API.

In accordance with an embodiment, the content management system 220, using data received via the server API from the commerce provider system, and describing products, can generate an instance of the product-field object, for each product in the list of products associated with the account at the commerce provider. Attributes of the product-field instances can be populated with data values received via the server API for each product in the list of products.

In accordance with an embodiment, for example, an administrative user can construct a publishable content from within the content management system using features such as, for example out-of-the-box templates, drag-and-drop components, sample page layouts, and site themes. The user can then incorporate an instance of the product-field object into the publishable content being created.

In accordance with an embodiment, the resultant machine-readable code can be of a type and format that can be interpreted or executed by a machine to display an online or publishable content (e.g., a web page, or mobile application (app) pages), including interactive features based on the attributes of the product-field object.

In accordance with an embodiment, based on an interaction with the interactive features, data associated with the product can be retrieved from the commerce provider; or data associated with a request can be sent to the commerce provider, to perform an action associated with the product.

In accordance with an embodiment, for example, the machine-readable code can be used in a mobile, web, or other online environment to enable retrieving real-time pricing and inventory information about a product from the commerce provider, based on one or more of the attributes of the product.

In accordance with an embodiment, as another example, the server API contract between the content management system and the commerce provider can require that the inventory information attribute, and the pricing information attribute, are to be provided as links that can retrieve data (e.g., real-time data) associated with these attributes.

In accordance with an embodiment, in this way, when the product is displayed on the publishable content (e.g., via user interaction with the publishable content), the end user can view up-to-date pricing and inventory information from the commerce provider system, seamlessly on the publishable content.

In accordance with an embodiment, as another example, the publishable content can include functionality that allows an end user to place an object in an online shopping cart of the commerce provider, or direct the user to a purchase page of the commerce provider, or even to execute a purchase at the commerce provider from the publishable content.

In accordance with an embodiment, the content management system, based upon 220, publish the shoppable content 204 in a number of different channels, such as, for example via a generated mobile application page 205, or via a generated web page 206.

In accordance with an embodiment, end users 245 can access such generated pages via a client device 240, for example via a mobile application 240 displaying the generated mobile application page 205, or via a web application, such as, for example a browser 242, accessing and displaying the generated web page 206. Via the client devices, then, the end users can interact with the published shoppable content.

In accordance with an embodiment, the publishable content (e.g., a web page 206, or mobile application (app) page 205) can be built using code libraries, such as, for example a software development kit (SDK) 207, which defines functionality and visual content components such as, for example a "Buy" button. The functionality associated with such visual components can be governed by the server API contract, and provided from the SDK.

Code Generation

In accordance with an embodiment, a modeled content architecture, can be used in order to enable a CMS to generate code required for shoppable content within a document, in accordance with an embodiment.

Figure 3:
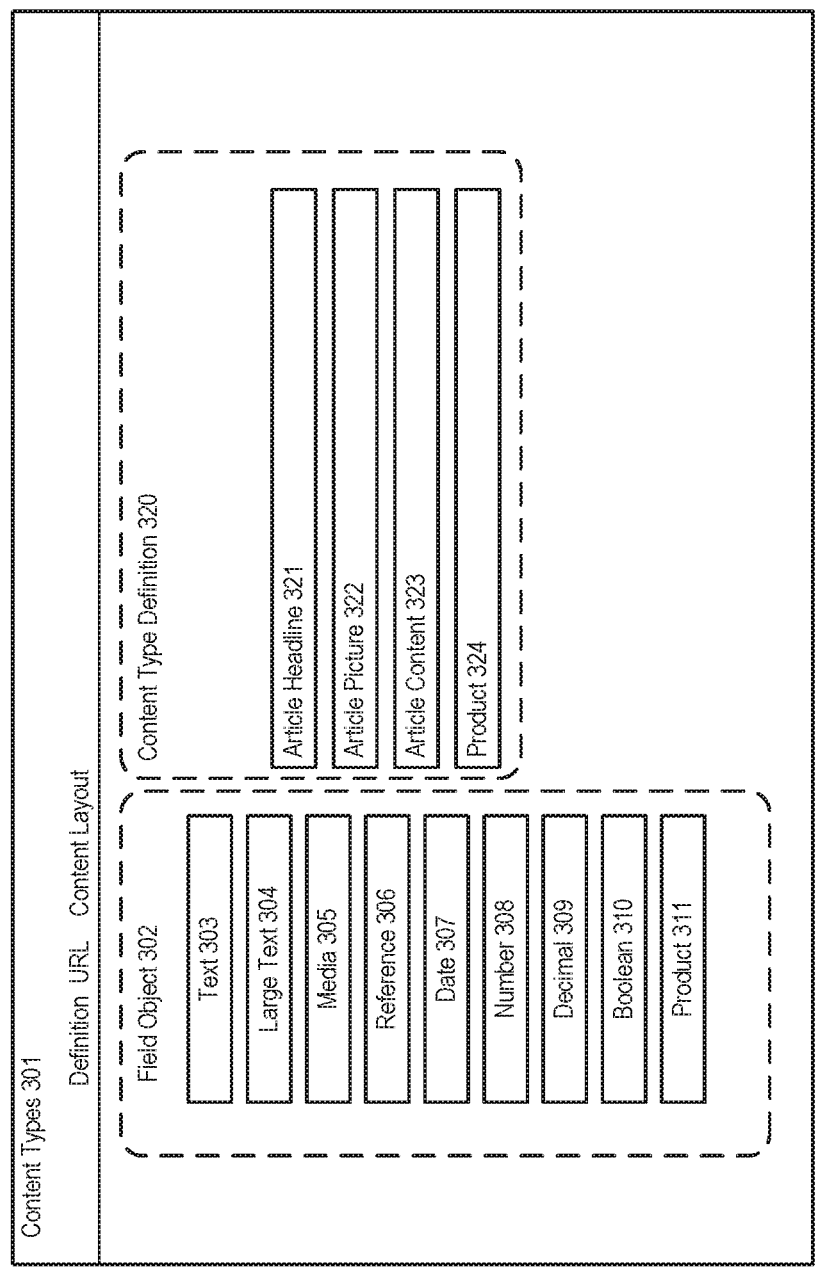
FIG. 3 illustrates exemplary type and field objects, in accordance with an embodiment.

For example, with reference to FIG. 3, which shows an exemplary UI for creating shoppable content, in accordance with an embodiment, a document-type/content type object 301 can represent a type of document that a user wishes to create (e.g., a website page, blog, HTML email, story board, mobile application page, etc.). Additionally, a field object 302 can represent a type of field that can be added to a document. Such a field object can include, for example, a text field 303, a large text field 304, a media field 305, a reference field 306, a date field 307, a number field 308, a decimal field 309, and a Boolean field 310. Such fields can be considered standard product fields. In addition, the field object 302 can include a special products field 311, which is shared by the content type definition field 320. In accordance with an embodiment, a field object can be a child object of the document-type object 301 or a child of another field object. Document-type objects and field objects include data attributes that define the objects.

In accordance with an embodiment, a content type definition 320 can allow for a user to drag and drop data fields (e.g., from 302) to build a content type definition. As show, for example, such fields include an article headline 321, article picture 322, and article content 323. Such fields can be considered, for example, configured product fields.

In accordance with an embodiment, the product field object 311 and 324 may be defined in the CMS. The product field object can define a number of attributes of a product. These attributes of the product field object can reflect the attributes defined in the admin API. Further, the attributes may be populated with values supplied from the commerce provider system via the admin API.

In accordance with an embodiment, the CMS, using data describing products received via the API from the commerce provider system, can generate an instance of the product field object for each product in the list of products associated with the account at the commerce provider system. Attributes of the product field instances can be populated with data values received via the API for each product in the list of products.

In accordance with an embodiment, an application programing interface (API) can be provided for use with the content management system, wherein the API facilitates communication and data exchange between the CMS and a commerce provider, e.g., online retailer system.

Figure 4:
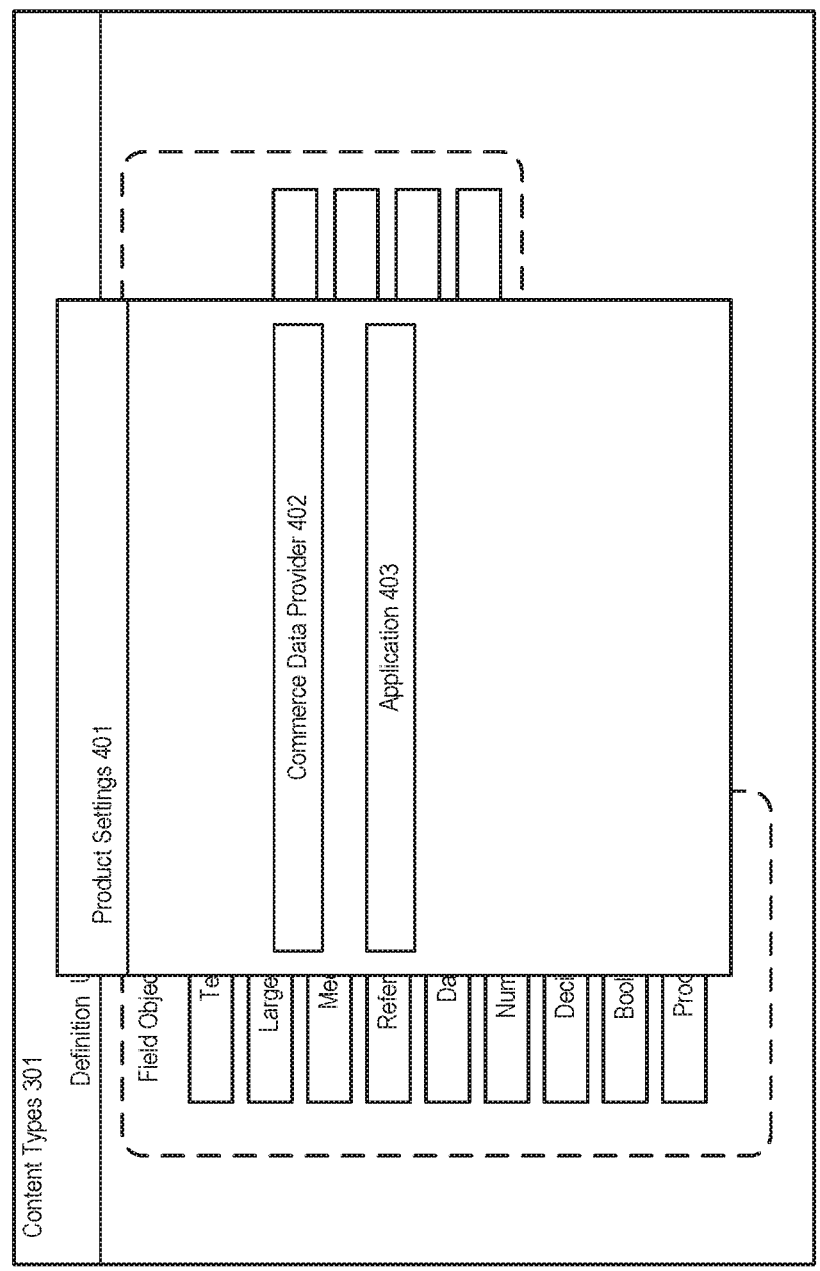
FIG. 4 illustrates an exemplary user interface, in accordance with an embodiment.

FIG. 4 illustrates an exemplary user interface, in accordance with an embodiment. The API of the CMS can receive inputs that indicates a commerce provider system 402 and an application 403 within the commerce provider system. Such settings can be received, for example, within a product settings 401 window. Account credentials (not shown) can be provided to the CMS. Further, the account at the commerce provider system can be associated with a set of products offered for sale by the online retailer.

FIG. 5 depicts exemplary attributes that can be defined for a product field object. The product field can comprise standard asset data 501, custom fields and data (for persuasive content) 502, and product details 503. As shown in FIG. 5, the product attributes may include an identifier, a title, body HTML, the vendor of the product, a handle, tags, inventory information, pricing information, etc. As noted above, the API may specify that some of these attributes are mandatory, while others are optional. FIG. 5 depicts the values stored in a JSON format, in accordance with an embodiment. However, other formats, such as, for example XML, delimited text, etc., can also be used to store the attribute values.

Figure 6:
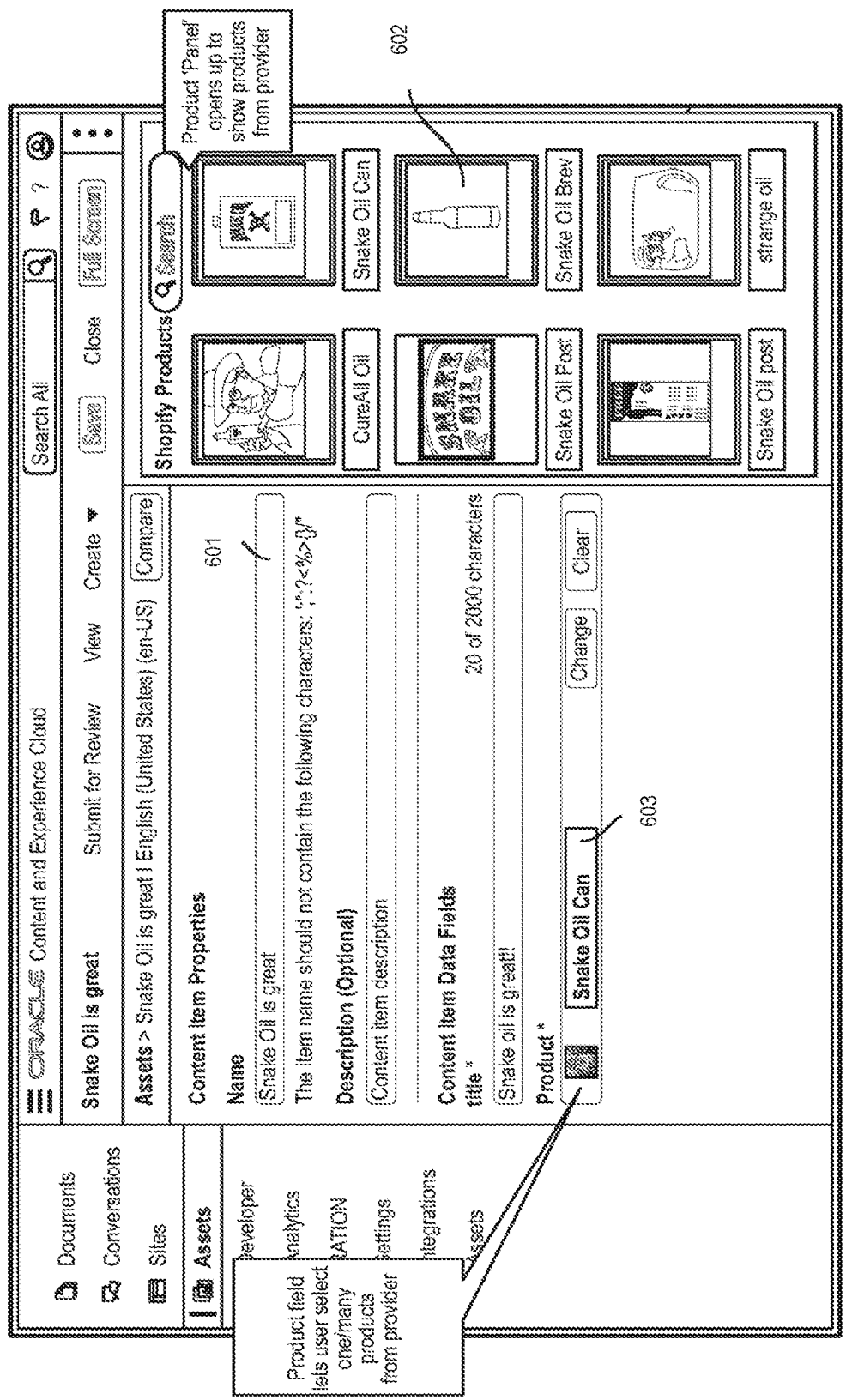
FIG. 6 illustrates an exemplary user interface, in accordance with an embodiment.

FIG. 6 illustrates an exemplary user interface, in accordance with an embodiment.

With reference to FIG. 6, in accordance with an embodiment, depicted are exemplary instances of product field objects as may be visually depicted within the CMS, in accordance with an embodiment. As shown in FIG. 6, a single instance 603 of a product field object can be selected for viewing and editing. Some of the values of the attributes of the selected instance 603 may be editable from text fields 601 in the CMS. Other instances 602 of product field objects representing other products in the list of products from the commerce provider system can be shown in a panel for selection by the CMS user.

In accordance with an embodiment, a user may construct a publishable web document from within the CMS using features provided by the CMS, such as, for example out-of-the-box templates, drag-and-drop components, sample page layouts, and site themes.

For example, in accordance with an embodiment, a user may incorporate the single instance 603 of the product field object into the publishable web document being created. Further, the CMS may generate, based on the values of the attributes of the product field object, the document type object, and various out-of-the-box templates, drag-and-drop components, sample page layouts, and site themes, machine readable code.

In accordance with an embodiment, the machine readable code can be of a type and format that can be interpreted or executed by a machine to display a document based on the machine readable code, wherein the document includes interactive features based on the attributes of the product field object. The code may also facilitate retrieving, based on interaction with the interactive features of the document, data associated with the product in the list of products from the commerce provider, e.g., online retailer, or sending data associated with a request to perform an action associated with the product to the online retailer.

For example, and in accordance with an embodiment, the code may facilitate retrieving real-time pricing and inventory information about a product from the commerce provider system, based on one or more of the attributes of the product. With reference again to FIG. 6, one or more of the attributes of the product field object may require an active link to real-time information about the product at the commerce provider system.

In accordance with an embodiment, for example, the API contract between the CMS and the commerce provider system may require that the inventory information attribute and the pricing information attribute be links that can retrieve data (e.g., real-time data) associated with these attributes. In this way, when the product is displayed on the published document (e.g., via user interaction with the published document), the user will view up-to-date pricing and inventory information from the commerce provider system seamlessly on the published document.

In accordance with an embodiment, the published document may include functionality that allows a user to place an object in an online shopping cart of the commerce provider system, or direct the user to a purchase page of the commerce provider system, or even to go execute a purchase at the commerce provider system from the published document.

For example, in accordance with an embodiment, referring back to FIG. 2, the published document (such as, for example webpage 206 or mobile app page 205) may be built using code libraries, such as, for example software development kits (SDK), that define functionality and visual document components such as, for example a "Buy" button.

In accordance with an embodiment, a "Buy" button or other visual/functional components, defined in an SDK, can be included by the CMS in a publishable document. The functionality associated with such visual components can be governed by the admin API 102, and provided from the SDK. In accordance with an embodiment, the SDK can be, e.g., a JavaScript or AJAX SDK. SDKs as described above can also be developed for other platforms, however.

Figure 7:
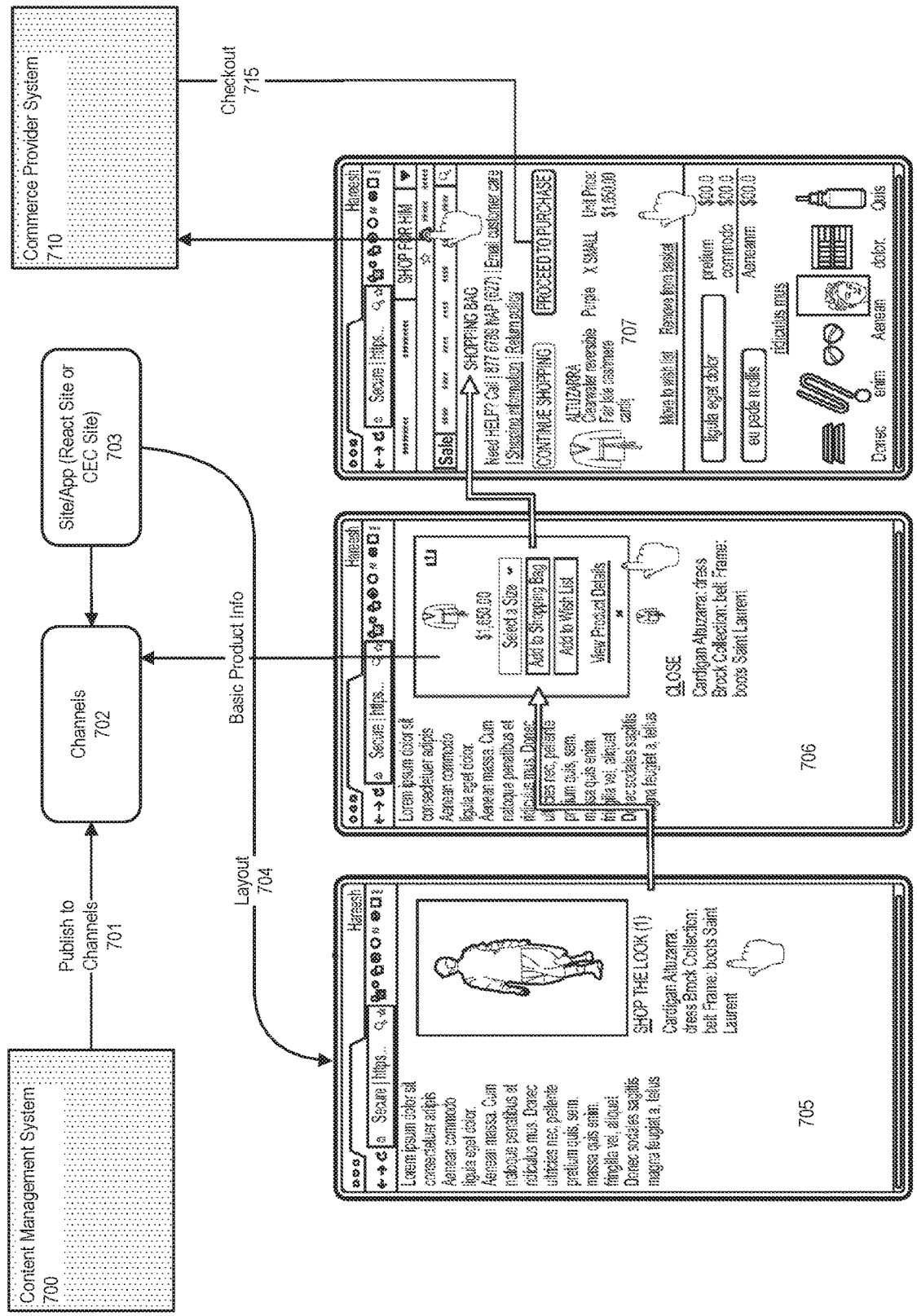
FIG. 7 illustrates an overview of shoppable content as experienced by an end-user, in accordance with an embodiment.

FIG. 7 illustrates an overview of shoppable content as experienced by an end-user, in accordance with an embodiment. FIG. 7 depicts a website generated by a CMS and configured with shoppable content.

In accordance with an embodiment, as described above, a content management system 700 can publish 701 to several channels 702 content, such as, for example shoppable content. The site or application (e.g., mobile application) 703 can utilize these channels to provide layout 704 within a, for example, website display 705 that comprises shoppable content (indicated by the tail of the arrow).

In accordance with an embodiment, the website displays products (a sweater) on a page of the site (the delivery channel) referred to as a "look book". The products are displayed as images on the page. An end-user can activate a control associated with the images of the products. Once activated, the control presents a display (over the web page) that includes the values of the product object fields associated with that product. This is shown, for example, in display 706, which is a later display of 705 after a user has selected a portion of the shoppable content. Some of the fields, such as, for example a price and/or an inventory quantity can be retrieved directly from a commerce provider system.

In accordance with an embodiment, within the further options given to an end user, the end user can then direct the website to a store/shopping bag page, where the shoppable content is available to be, for example, purchased or added to a shopping cart. This is shown, for example, at 707, which can be a shopping bag/cart of the commerce provider system.

In accordance with an embodiment, activation of certain controls can send data back to the commerce provider system 710—for example, a user activated control can place an item in a shopping bag and/or take the end-user to a checkout page of the commerce provider system. The checkout process 715 can take place between page 707 and the commerce provider system 710.

Figure 8:
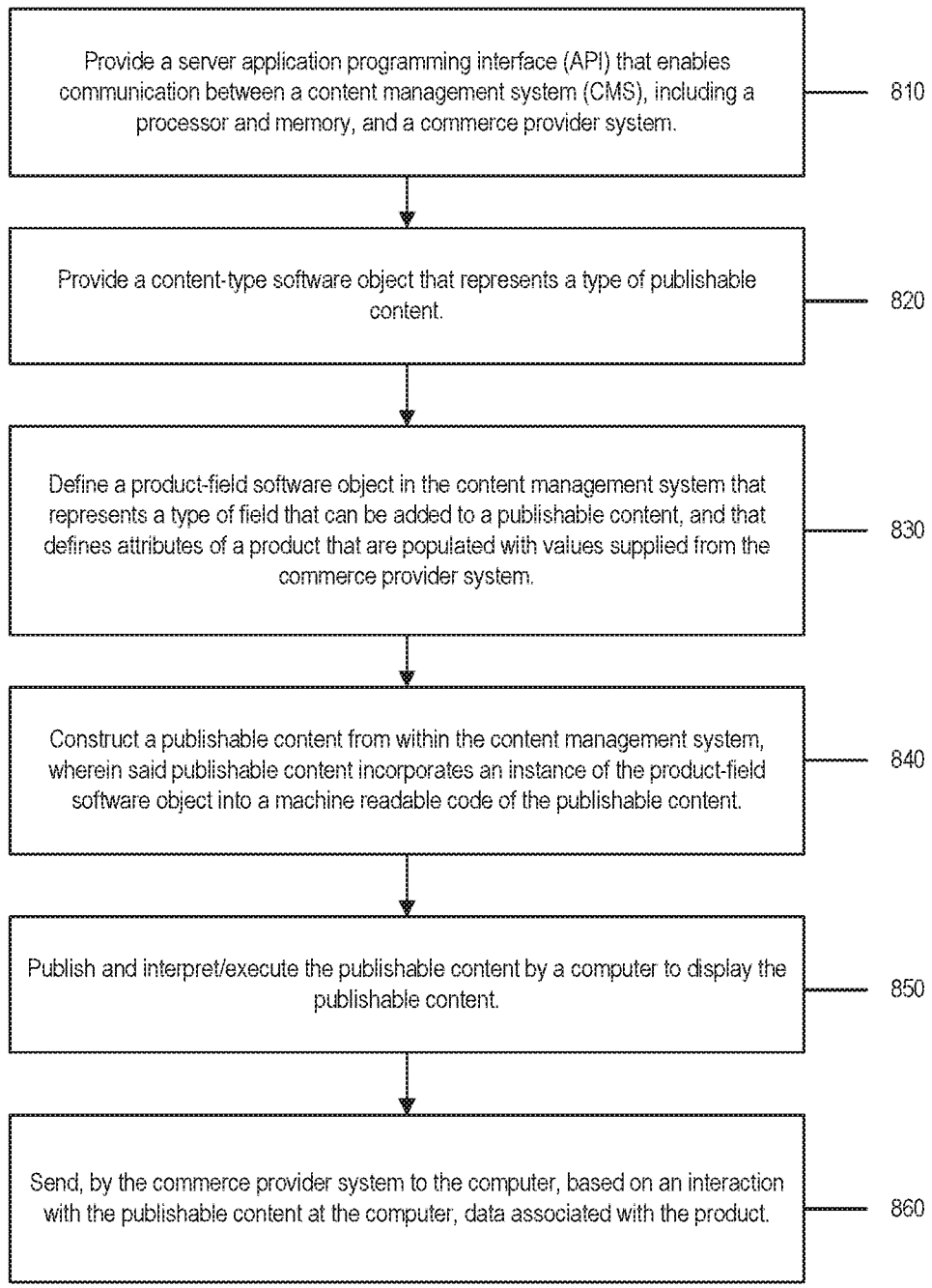
FIG. 8 is a flowchart of a method for management and delivery of shoppable content, in accordance with an embodiment.

FIG. 8 is a flowchart of a method for management and delivery of shoppable content, in accordance with an embodiment.

In accordance with an embodiment, at step 810, the method can provide a server application programming interface (API) that enables communication between a content management system (CMS), including a processor and memory, and a commerce provider system.

In accordance with an embodiment, at step 820, the method can provide a content-type software object that represents a type of publishable content.

In accordance with an embodiment, at step 830, the method can define a product-field software object in the content management system that represents a type of field that can be added to a publishable content, and that defines attributes of a product that are populated with values supplied from the commerce provider system.

In accordance with an embodiment, at step 840, the method can construct a publishable content from within the content management system, wherein said publishable content incorporates an instance of the product-field software object into a machine readable code of the publishable content.

In accordance with an embodiment, at step 850, the method can publish and interpret/execute the publishable content by a computer to display the publishable content.

In accordance with an embodiment, at step 860, the method can send, by the commerce provider system to the computer, based on an interaction with the publishable content at the computer, data associated with the product.

Example Use Cases

In accordance with an embodiment, the described approach enables use of a content management system, and automatic generation of machine-readable code to facilitate delivery of shoppable content, which is of particular use to companies interested in rapid development and deployment of web-based, mobile, or other online content.

The feature enables the authoring, publishing, and consumption of 'shoppable content' in a seamless manner by incorporating both content management and commerce systems into a single cooperating unit.

Object Detection System (Content Creation Tool)

As described above, in accordance with an embodiment, a content management system, such as, for example, an Oracle Content and Experience Cloud (OCE) environment, enables the creation of shoppable content that provides a purchasing opportunity directly from the content itself.

For example, shoppable content can allow consumers to either add products directly to a cart of a commerce provider, e.g., online retailer, from the content they are viewing, or be taken to a product page of an online retailer from where the consumer can continue to shop. Shoppable content offers a more seamless and transparent purchasing experience for web-based consumers.

Traditionally the development of web documents (e.g., sites or applications) associated with such content has been performed manually by content creators who identify and mark suitable objects present in an image, and then attach or link an appropriate ecommerce product to the marked objects.

Figure 9:
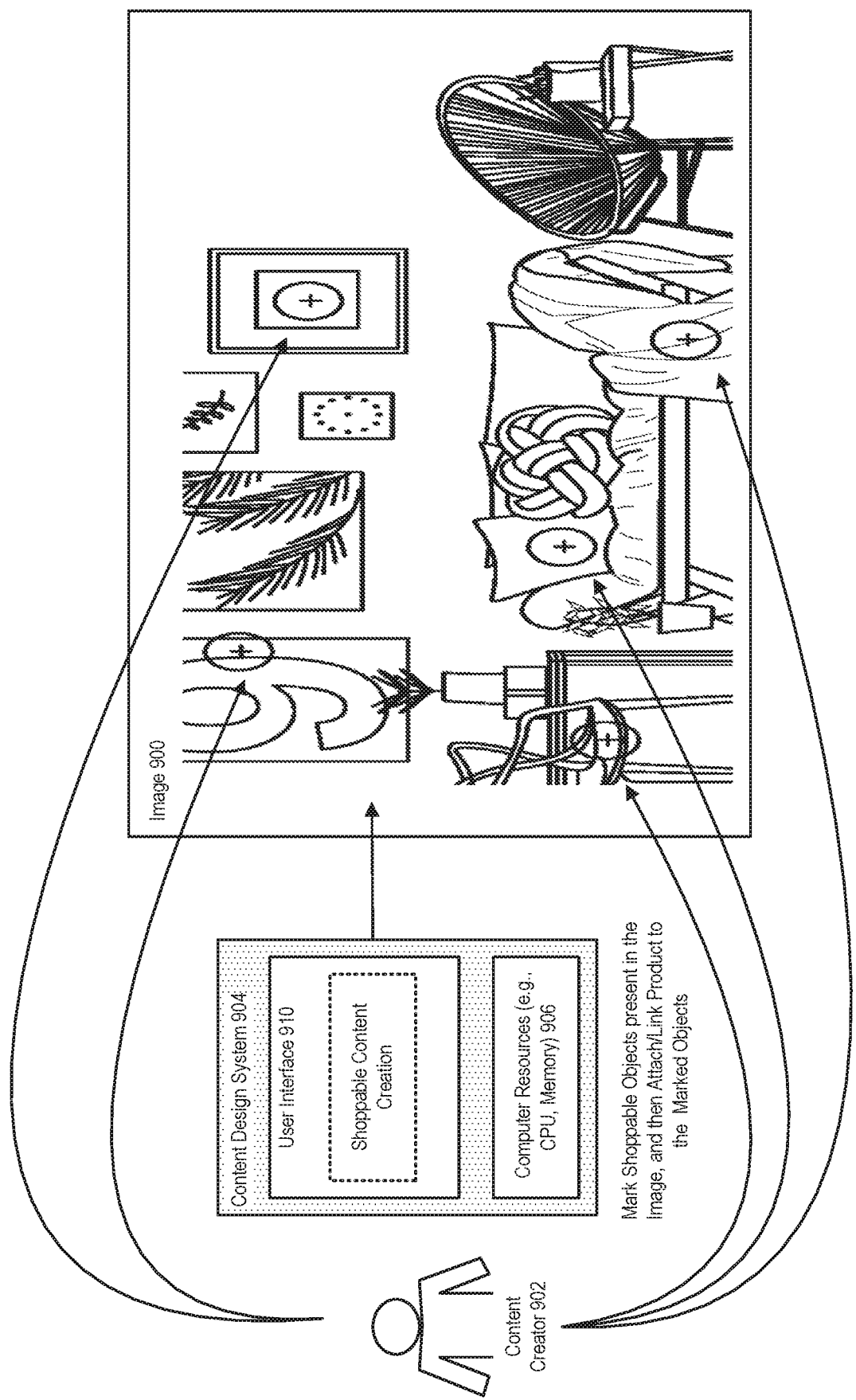
FIG. 9 illustrates an example of multiple shoppable objects present in an image, in accordance with an embodiment.

For example, FIG. 9 illustrates an example of multiple shoppable objects present in an image, in accordance with an embodiment. As illustrated therein, an image 900 may include several objects. In this example, the pillow, the chair, the photo frame and all other items marked with the "+" sign, are shoppable objects present in a single image. A content creator 902 can utilize a content design system 904, including a computer resources 906 and user interface 910, to view the image and to determine shoppable content within the image.

Generally, content creators mark the shoppable objects present in the image, and then attach or link an ecommerce product to each marked object, which then enables customers to add the product to their shopping cart directly from, e.g., the content in a web page.

However, such a process of manually identifying and marking suitable objects present in an image can be error prone and time consuming, particularly when a single image may include multiple shoppable objects. When the number of content objects to be annotated increases over time, the complexity similarly increases; and in some instances the content creator may have to repeat the above-described procedure for all the objects present in a single image, as well as across multiple images.

To address the above, in accordance with an embodiment, the system can include, support, or operate in accordance with a content creation tool, that can incorporate aspects of artificial intelligence, for use with shoppable content data, including, for example, performing automatic detection of objects in an image; and automatic discovery of products to be mapped with the shoppable objects or shoppable content; for use in publishing the shoppable content in mobile application, web, or other document formats.

Figure 10:
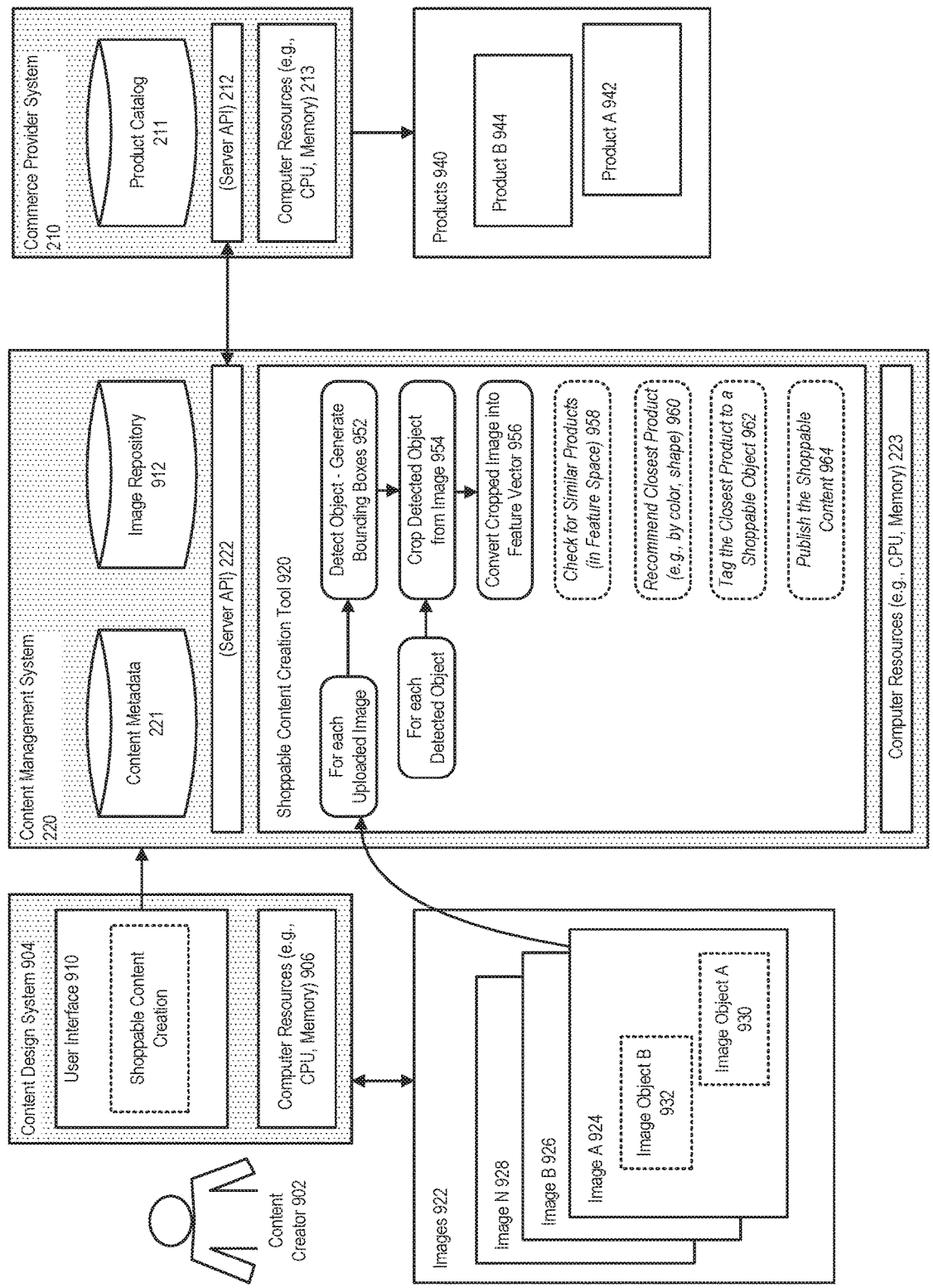
FIG. 10 illustrates the use of a content creation tool with shoppable content data, in accordance with an embodiment.

FIG. 10 illustrates the use of a content creation tool with shoppable content data, in accordance with an embodiment.

In accordance with an embodiment, an object detection system or content creation tool can operate using a transfer learning technique, that enables the system to automatically identify multiple customer products inside each of one or more digital contents (for example, images) through a custom object detection model, trained on customer domain data.

In accordance with an embodiment, the object detection system or content creation tool is adapted to locate customer products in a digital content (for example, an image) and generate and display bounding boxes around the products (shoppable objects) in the image that facilitates the linking of actual products from the commerce provider with the shoppable objects present in the digital content.

In accordance with an embodiment, the object detection system or content creation tool can generate additional feature vectors stored within a vector space data structure, corresponding to the shoppable objects present in the digital contents (for example, images), based on the image features identified within the cropped bounding box area of the detected products. The object detection system or content creation tool can convert shoppable objects inside digital images into vectors within a multi-dimensional vector space, and compare input content with a plurality of actual product images, to find a number of relevant product options among the customer products. This vector space comparison speeds up the linking of actual products to the identified shoppable objects present inside an image.

In accordance with an embedment, the above-described features can be used to enable a content management system to generate one or more image metadata attributes (e.g., tags) based on the customer products present inside in the content management system for each of the images. This metadata information can be captured in the content management system to enrich the original content. The metadata information can also be made available for a search and discovery, including smart searching and sorting.

In accordance with an embodiment, the system includes a shoppable content JavaScript container/widget that generates image hyperlinks to correctly include image maps (e.g., clickable areas within the image). Each such image map can link a shoppable product in the image that allows a user to, for example, add those products directly to the user's shopping cart from a customer web page.

As illustrated in FIG. 10, the content management system, such as for example an OCE environment as described above, can include an image repository 912 that comprises images of various objects. For example, the image repository can include examples of various products that a commerce provider might make available for purchase by consumers.

In accordance with an embodiment, an object detection system or content creation tool 920 enables a content creator to upload or otherwise provide to the environment a set or plurality of images 922, including for example image A 924, image B 926, and image N 928, for processing by the environment. Each image can include one or more image objects, for example image object A 930 and image object B 932; which the system can subsequently determine as shoppable objects for matching to a set of products 940, for example product A 942, or product B 944.

In accordance with an embodiment, the shoppable content tool can be adapted to perform a process of, for each uploaded image, and each detected object: detecting the object and generating bounding boxes (952); cropping the object from the image (954); converting the cropped image into a feature vector (956); checking for similar products in a feature space (958); recommending a closest product (e.g., by color, or shape) (960); tagging the closest product to a shoppable object (962); and publishing the shoppable content (964), for example, to a website, app, or other documents through delivery channels.

The process can be repeated for each object in a particular image, and for each of a plurality of images.

In accordance with an embodiment, the process of object detection, and creation of feature vectors as described below, can be customized or trained on customer domain data; which can include training of an appropriate customer domain model, for example as provided by a TensorFlow or other type of artificial intelligence (AI) or machine learning (ML) technique.

For example, in accordance with an embodiment, an object detection process can utilize a domain model to draw bounding boxes in the image, and mark shoppable objects present in the image. In accordance with other embodiments, other methods of processing images, or use of domain model or AI/ML techniques, to determine suitable objects within the images, or determining feature vectors can be used.

When compared to the traditional process of manually identifying and marking suitable objects present in an image, as described above, the process of object detection described herein means that the content creator does not need to manually locate objects in a picture to draw boxes around them.

In accordance with an embodiment, the components and processes illustrated in FIG. 10, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

Discovery of Similar Products

A challenging aspect of shoppable content creation arises when each object present in an image has to be mapped to an actual product present in, for example, a content repository or repository of products available for purchase by a customer. Since such repositories may contain thousands of products, it can be difficult for content creators to determine by themselves which are the most appropriate set of products for use with the shoppable object.

In accordance with an embodiment, to address this, the system can employ a custom feature extractor to transform the image into a feature vector, and then compare that feature vector with those of the actual products in a feature space.

Generally described, converting an entire image into a feature vector may not provide a best matched product, since images can contain multiple objects that are of no interest, or even unintended objects, resulting in a combined feature vector that is far from the objects of interest. For example, an image of a person wearing eyeglasses may contain not only eyeglasses, but also a person wearing the eyeglasses or the person's clothes—neither of which are relevant in the feature space when finding similar looking eyeglasses.

Figure 11:
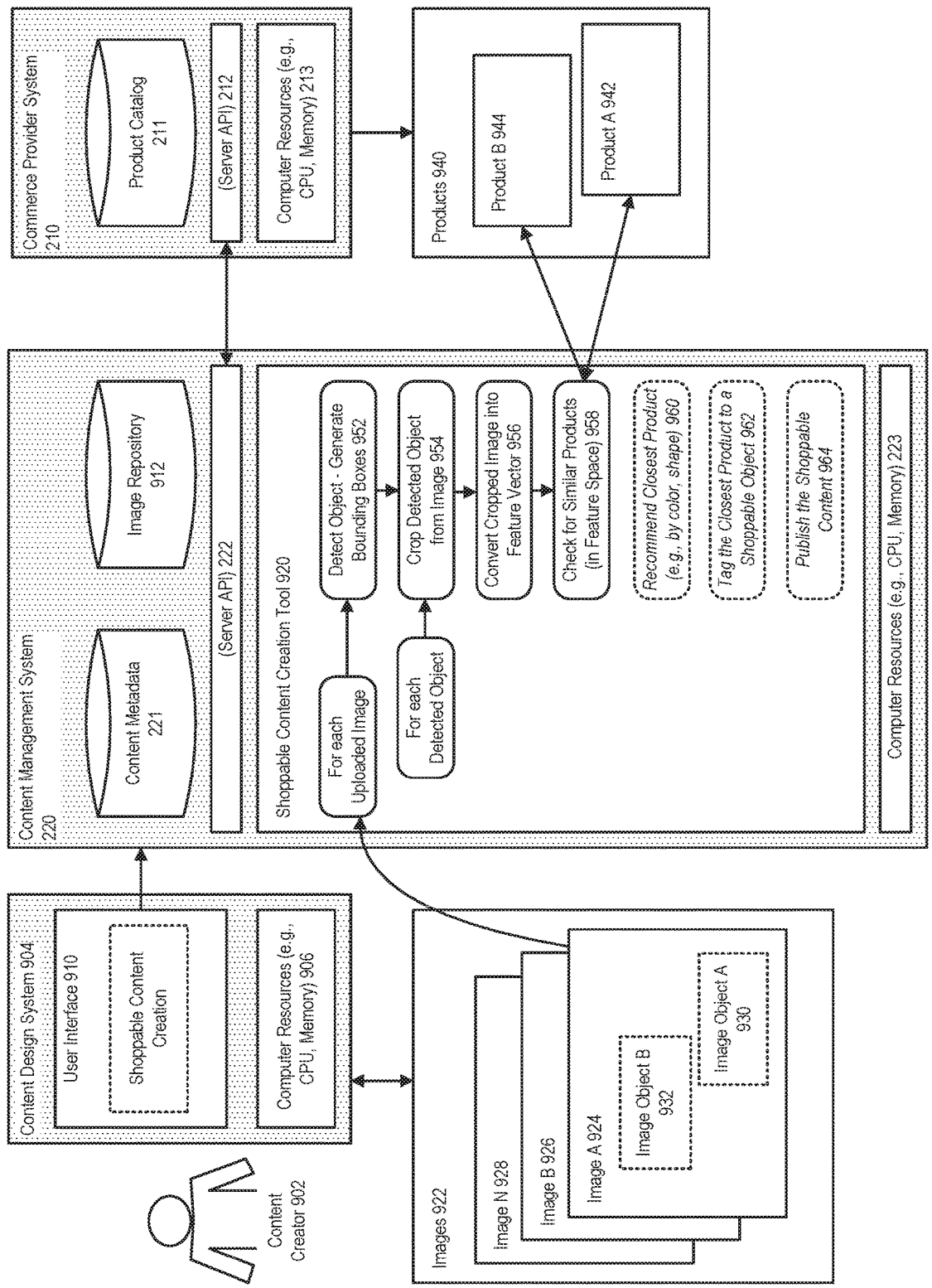
FIG. 11 further illustrates the use of a content creation tool with shoppable content data, in accordance with an embodiment.

FIG. 11 further illustrates the use of a content creation tool with shoppable content data, in accordance with an embodiment.

As illustrated in FIG. 11, in accordance with an embodiment, to improve the use of feature vectors, the object detection system or content creation tool can first crop those objects within an image resulting from the process of object detection; and compare these cropped images to the actual product images. In the above example of an image of a person wearing eyeglasses, the cropped portion will contains those features or objects of interest only, in this example the eyeglasses.

Once cropped and extracted into the feature space, the feature vectors associated with the objects can then be compared for their shape, color and various other attributes, and the most visually similar images (corresponding to products in the repository) can be recommended to attach with the shoppable object.

Figure 12:
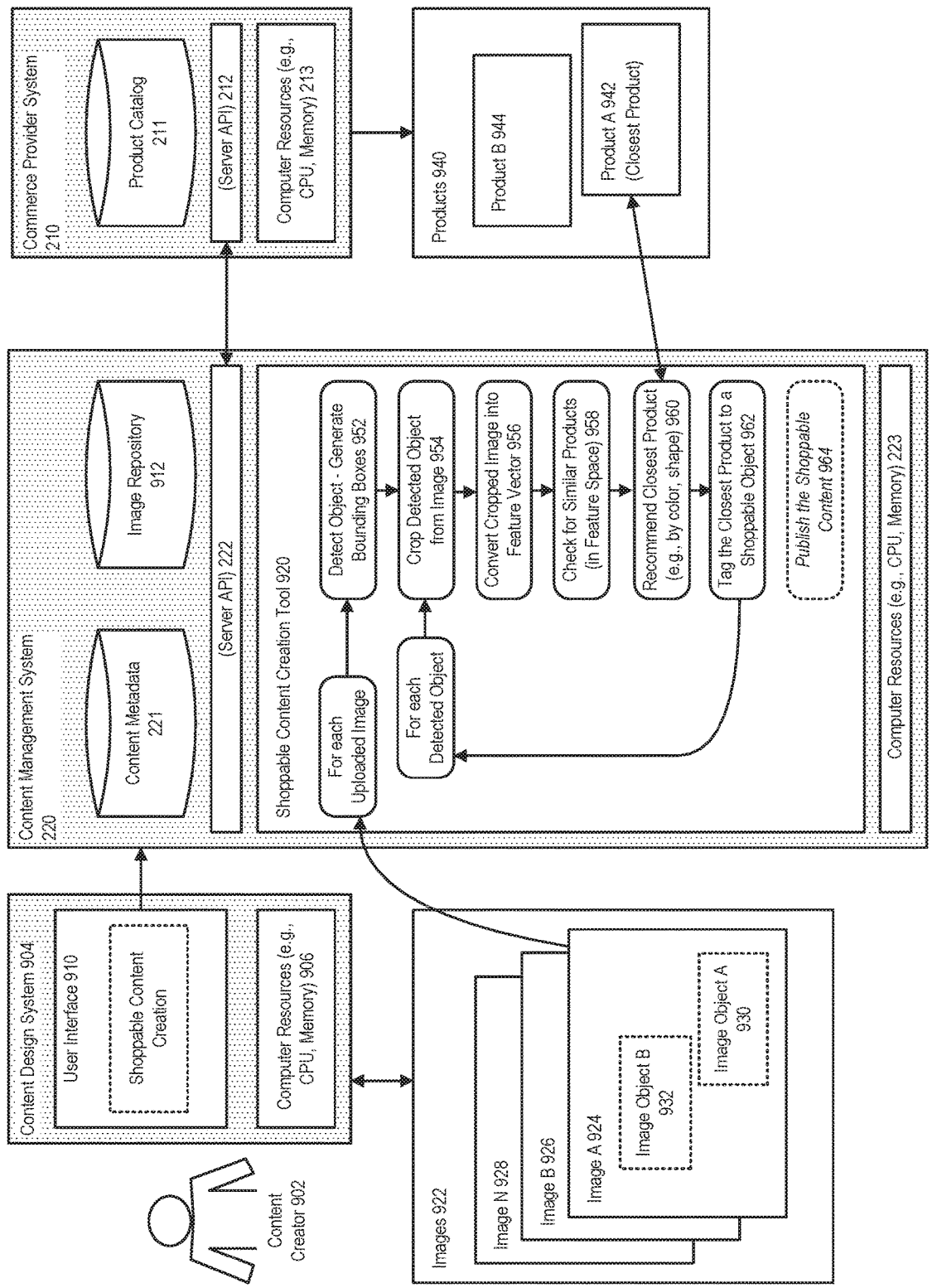
FIG. 12 further illustrates the use of a content creation tool with shoppable content data, in accordance with an embodiment.

FIG. 12 further illustrates the use of a content creation tool with shoppable content data, in accordance with an embodiment.

As illustrated in FIG. 12, in accordance with an embodiment, in the feature space, the system can determine, for example, based on shape or color, a best-matched or closest product to the shoppable object determined in the image, to attach with the shoppable object—in this example, product A (942).

As described above, in accordance with an embodiment, the process of object detection, and creation of feature vectors, can be customized or trained on customer domain data; which can include training of an appropriate customer domain model, for example as provided by a TensorFlow or other type of artificial intelligence (AI) or machine learning (ML) technique.

Figure 13:
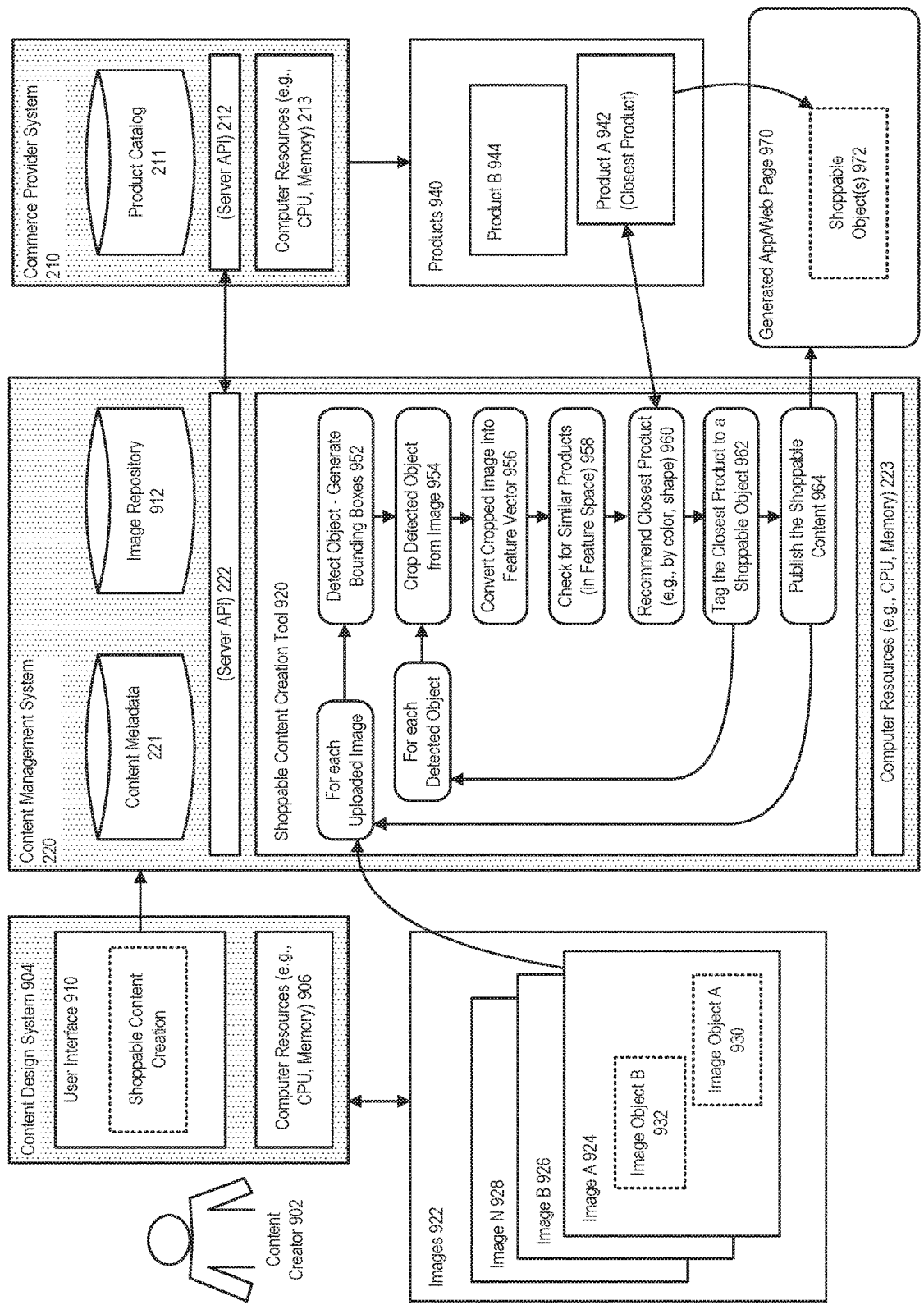
FIG. 13 further illustrates the use of a content creation tool with shoppable content data, in accordance with an embodiment.

Publish Shoppable Content into Web Documents:

FIG. 13 further illustrates the use of a content creation tool with shoppable content data, in accordance with an embodiment.

As illustrated in FIG. 13, in accordance with an embodiment, once suitable shoppable objects have been determined using the above steps, the object detection system or content creation tool can generate, for example a mobile application or web page 970, including the shoppable object(s) 972.

In accordance with an embodiment, the process of object detection, and generating feature vectors to facilitate image search based of object similarities and linking of objects to products in the repository, enables storing this information along with the original content, as a relationship between the original content and shoppable content.

This relationship provides that when the original content is published, the associated shoppable content are published together, and that a client device or application that consumes the original content can enable purchasing of associated products, for example, by automatically placing the product into a consumer's shopping cart.

In accordance with an embodiment, when using a design system such as that described above. to add the shoppable content to a web page, a shoppable content JavaScript container/widget can be embedded in the image, which then facilitates hyperlinks/visual annotations (e.g., as + signs) against the objects. An on-click action on the target icon can then, for example, enable a user to add the content directly to the shopping cart.

Example Processing of Images

As described above, converting an entire image into a feature vector may not provide a best-matched product, since images can contain multiple objects that are of no interest, or even unintended objects, resulting in a combined feature vector that is far from the objects of interest. For example, an image of a person wearing eyeglasses may contain not only eyeglasses, but also a person wearing the eyeglasses or the person's clothes—neither of which are relevant in the feature space when finding similar looking eyeglasses.

Figure 14:
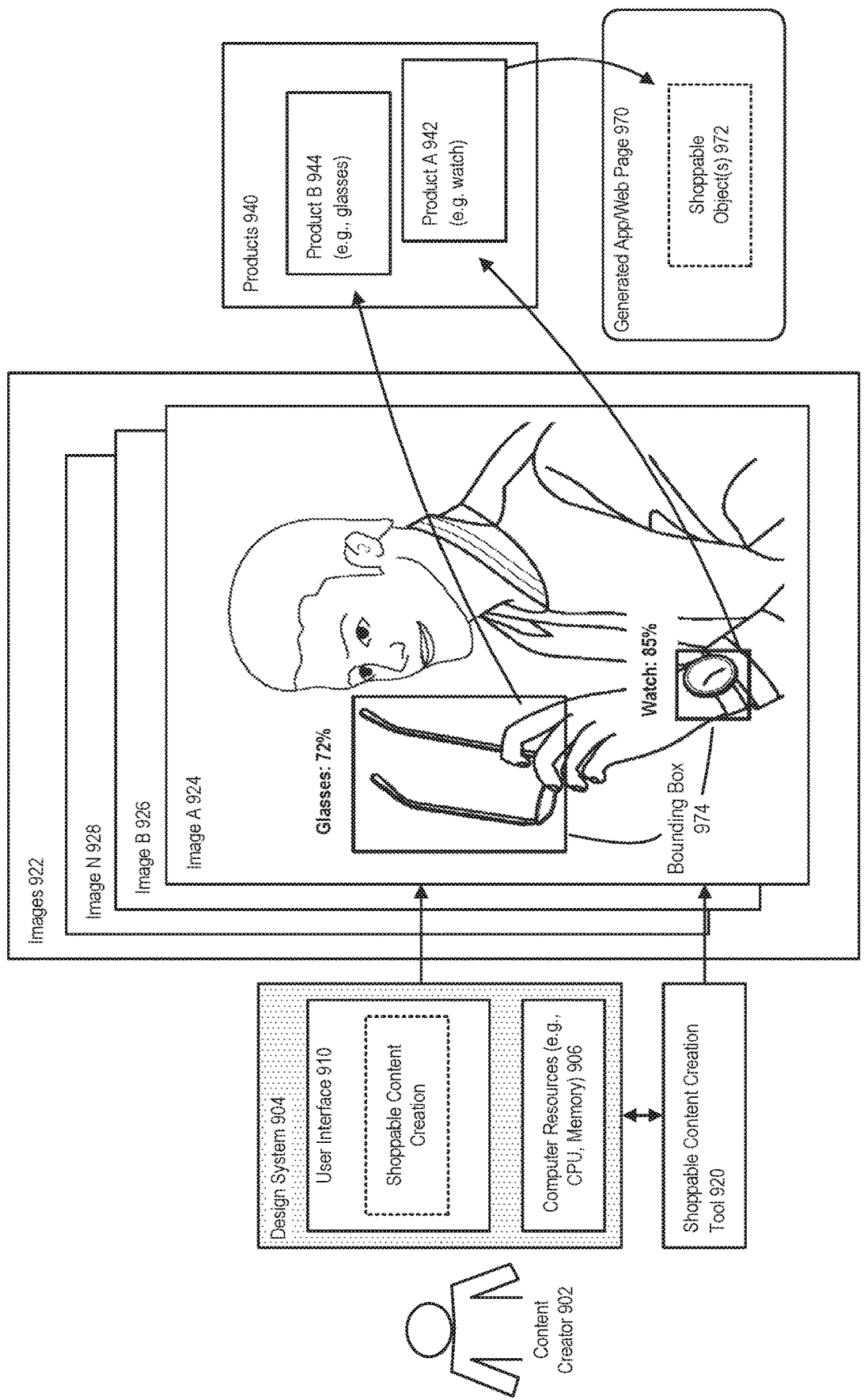
FIG. 14 illustrates an example use of a content creation tool with an image, to create shoppable content data, in accordance with an embodiment.

FIG. 14 illustrates an example use of an object detection system or content creation tool with an image, to create shoppable content data, in accordance with an embodiment; in which the trained model can be used to detect, for example, watches and eyeglasses, which output can then be used to match products. Bounding boxes 974 can be generated for objects of interest within the image. Remaining portions of the image—perhaps directed to other types of objects that are not of immediate interest—can be ignored.

In accordance with an embodiment, the system can calculate a confidence score, for example as a percentage value (%), to reflect a likelihood that a detected object within an image is a particular type of product, such as for example that a first detected object is 72% likely to be glasses, or that a second detected object is 85% likely to be a watch. The system can use this information to help direct which type of shoppable product to look for. In accordance with an embodiment, the percentage values are not displayed to the user, but can be used as a threshold to decide whether to show the bounding box or not. Such a threshold can be, for example, a global value (say, 50%), or statistically calculated for each class.

Shoppable Objection Detection and Publication Process

Figure 15:
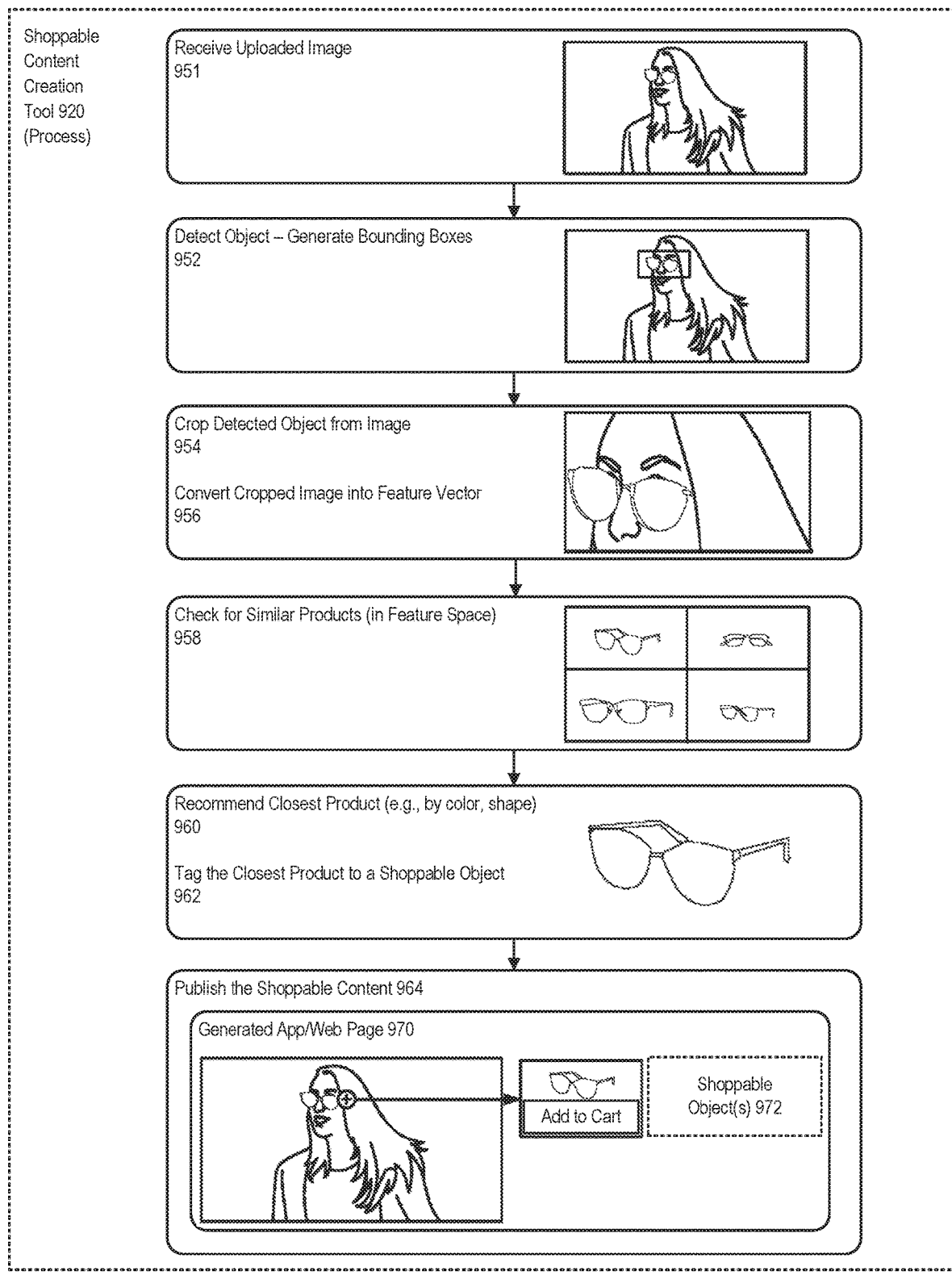
FIG. 15 illustrates a process used by a content creation tool to create shoppable content, in accordance with an embodiment.

FIG. 15 illustrates a process used by a content creation tool to create shoppable content, in accordance with an embodiment.

As illustrated in FIG. 15, in accordance with an embodiment, the object detection system or content creation tool can be used to perform a process of automatic detection of shoppable objects in a received or uploaded image 951, including at first step 952, detecting the object and generating bounding boxes.

In accordance with an embodiment, the process includes, at a subsequent step 954, cropping the object from the image.

In accordance with an embodiment, the process includes, at a subsequent step 956, converting the cropped image into a feature vector.

In accordance with an embodiment, the process includes, at a subsequent step 958, checking for similar products in a feature space.

In accordance with an embodiment, the process includes, at a subsequent step 960, recommending a closest product (e.g., by color, or shape).

In accordance with an embodiment, the process includes, at a subsequent step 962, tagging the closest product to a shoppable object.

In accordance with an embodiment, the process includes, at a subsequent step 964, publishing the shoppable content, for a mobile application or web page 970 including the shoppable object(s) 972.

The above-described process can be repeated for each object in a particular image, and for each of a plurality of images.

Example Use of Object Detection System (Content Creation Tool)

Figure 16:
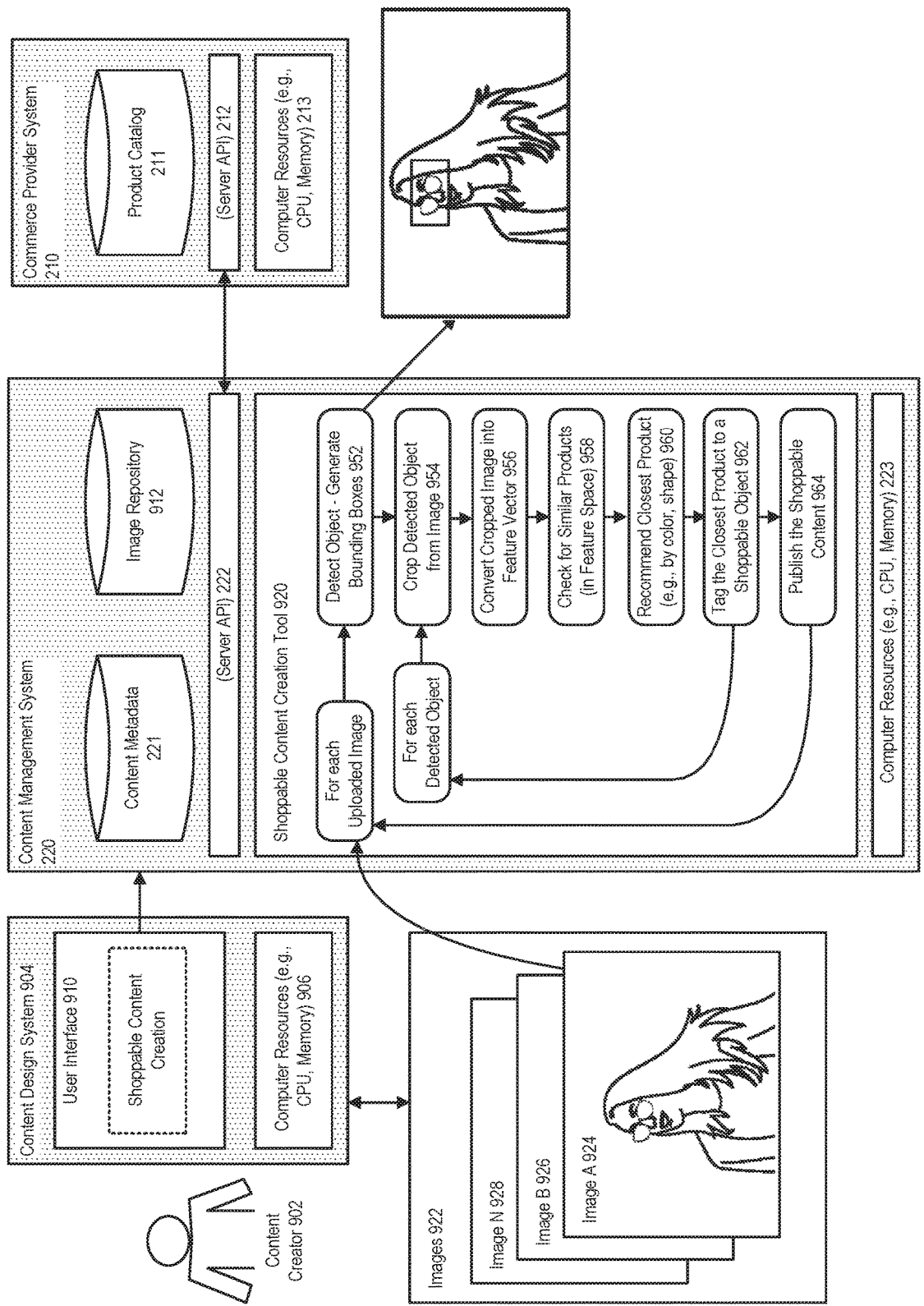
FIG. 16 illustrates an example of a content creation tool used to create shoppable content, in accordance with an embodiment.

FIG. 16 illustrates an example of a content creation tool used to create shoppable content, in accordance with an embodiment.

As illustrated in FIG. 16, in accordance with an embodiment, in this example, which includes an image of a person wearing eyeglasses, the step of detecting the object and generating bounding boxes (952) can include generating a bounding box around the eyeglasses displayed in the image.

Figure 17:
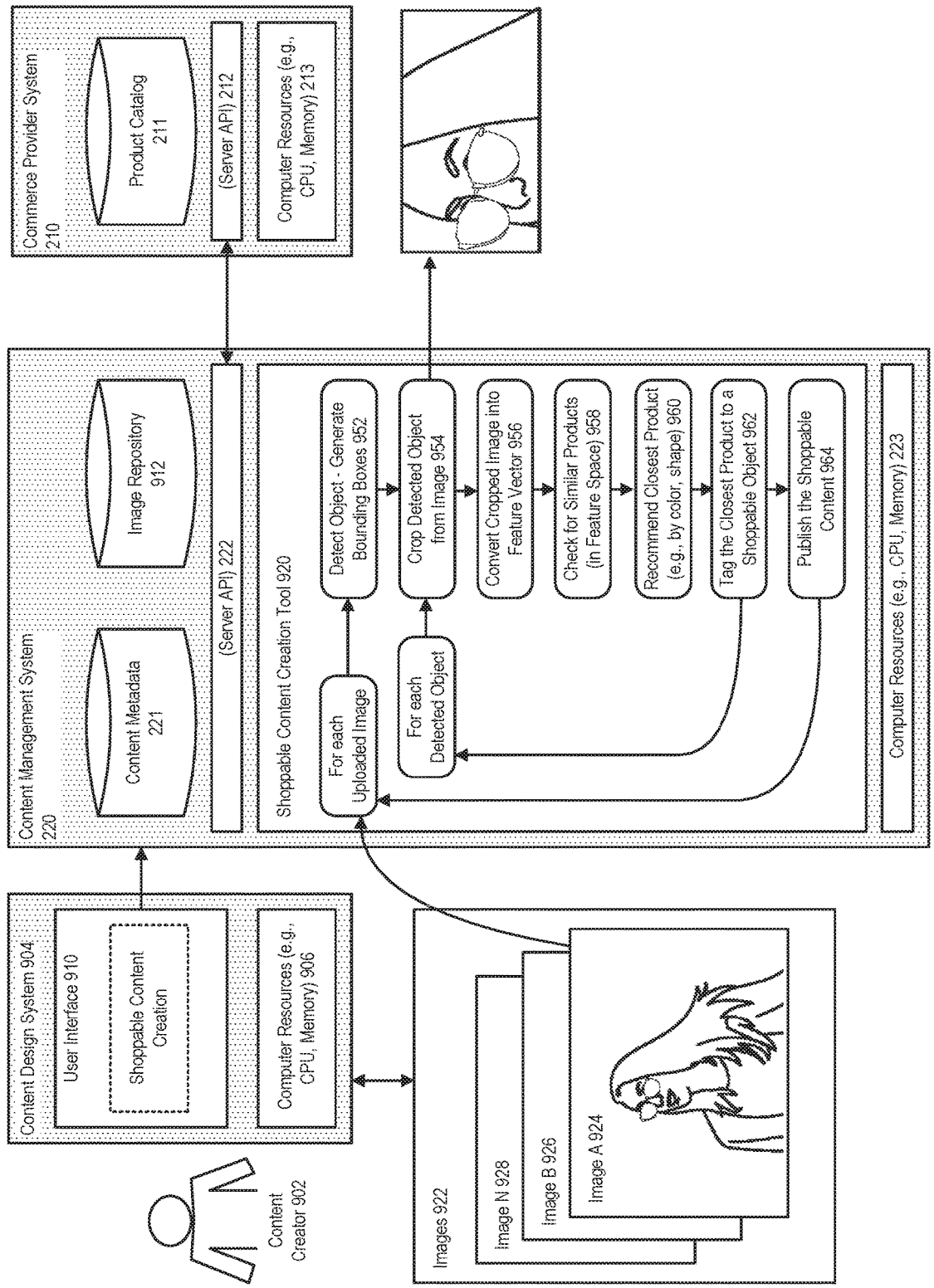
FIG. 17 further illustrates an example of a content creation tool used to create shoppable content, in accordance with an embodiment.

FIG. 17 further illustrates an example of a content creation tool used to create shoppable content, in accordance with an embodiment.

As illustrated in FIG. 17, in accordance with an embodiment, and continuing the example of a person wearing eyeglasses, the steps of cropping the object from the image (954); and converting the cropped image into a feature vector (956) can include creating a feature vector for the eyeglasses displayed in the image.

Figure 18:
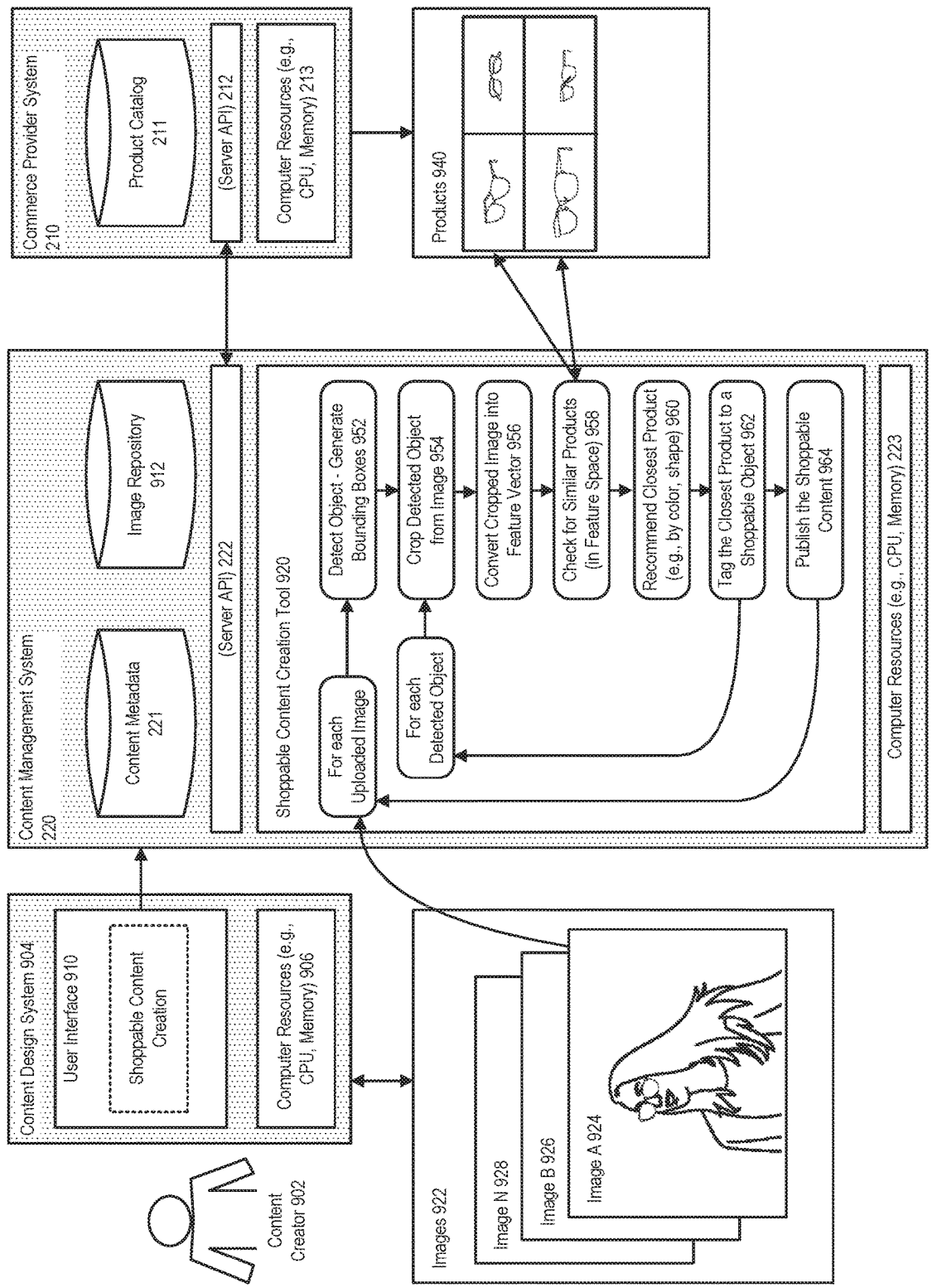
FIG. 18 further illustrates an example of a content creation tool used to create shoppable content, in accordance with an embodiment.

FIG. 18 further illustrates an example of a content creation tool used to create shoppable content, in accordance with an embodiment.

As illustrated in FIG. 18, in accordance with an embodiment, and continuing the example of a person wearing eyeglasses, the step of checking for similar products in a feature space (958) can include checking for eyeglasses products that best match the feature vector associated with the eyeglasses displayed in the image.

Figure 19:
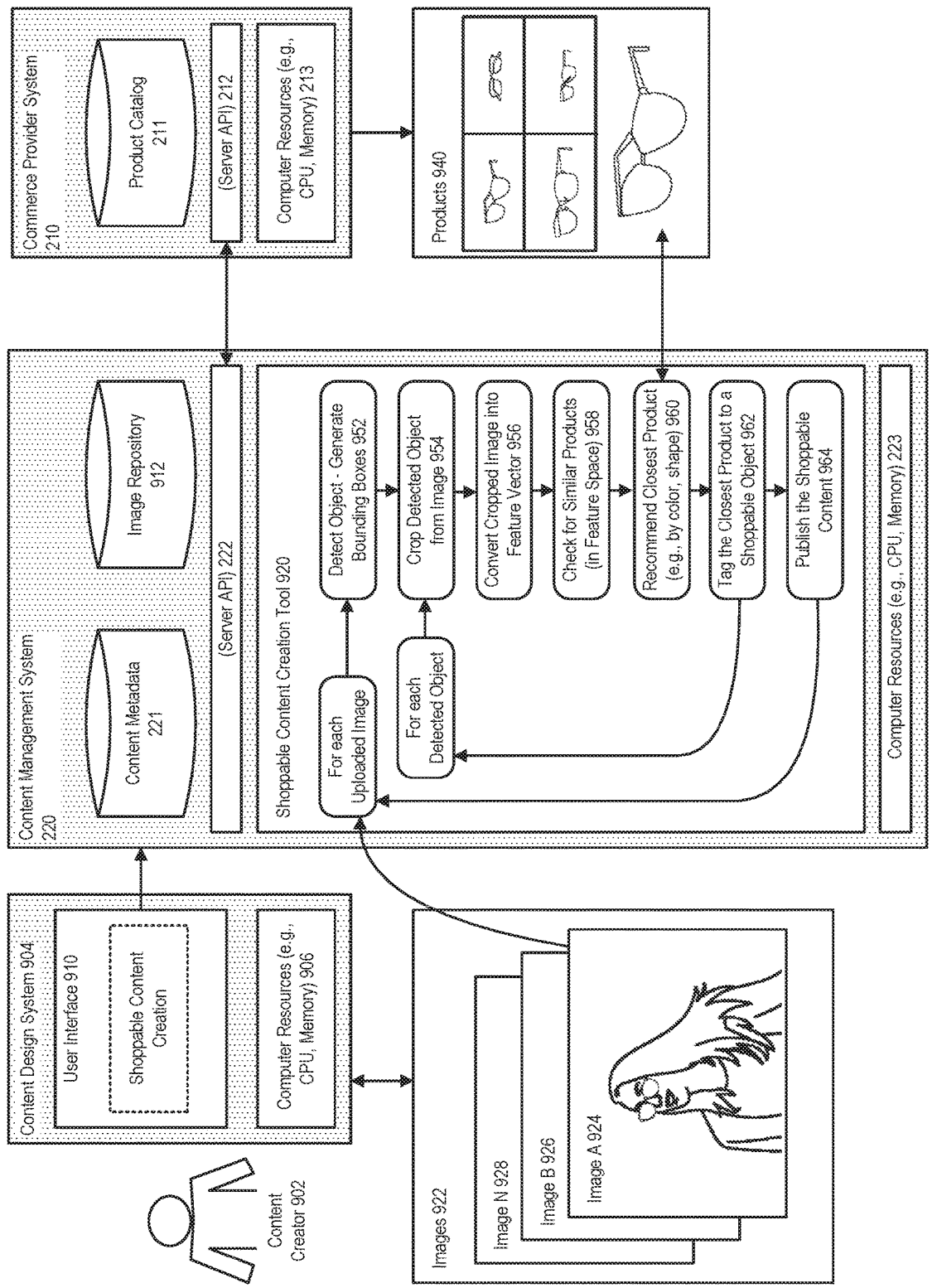
FIG. 19 further illustrates an example of a content creation tool used to create shoppable content, in accordance with an embodiment.

FIG. 19 further illustrates an example of a content creation tool used to create shoppable content, in accordance with an embodiment.

As illustrated in FIG. 19, in accordance with an embodiment, and continuing the example of a person wearing eyeglasses, the step of recommending a closest product (e.g., by color, or shape) (960); and tagging the closest product to a shoppable object (962) can include recommending a closest pair of eyeglasses product (to the eyeglasses displayed in the image), and tagging that product.

Figure 20:
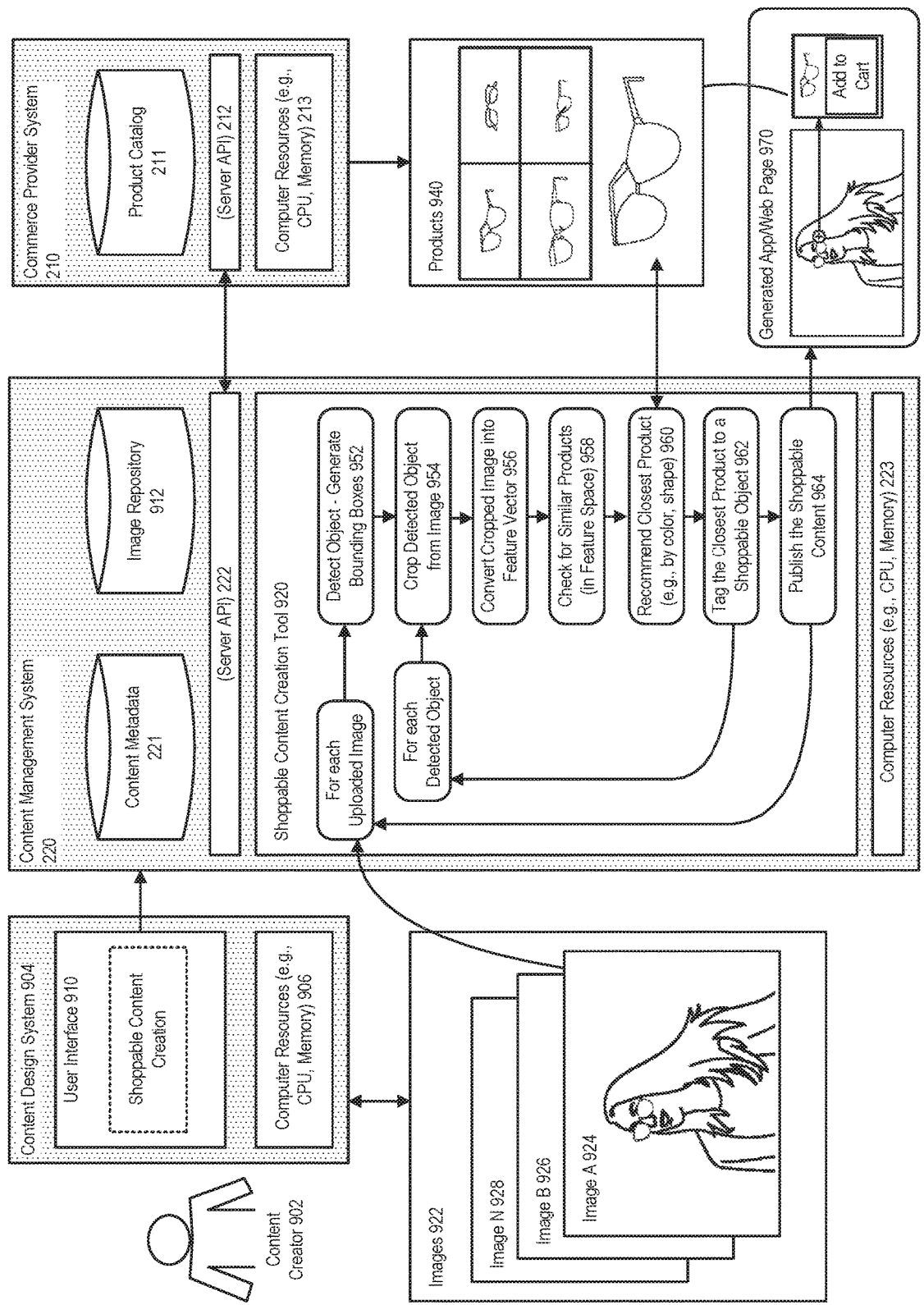
FIG. 20 further illustrates an example of a content creation tool used to create shoppable content, in accordance with an embodiment.

FIG. 20 further illustrates an example of a content creation tool used to create shoppable content, in accordance with an embodiment.

As illustrated in FIG. 20, in accordance with an embodiment, and continuing the example of a person wearing eyeglasses, the step of publishing the shoppable content (964), can include generating content including links to the product, for use in a mobile application or web page 970 including the shoppable object(s) 972.

Figure 21:
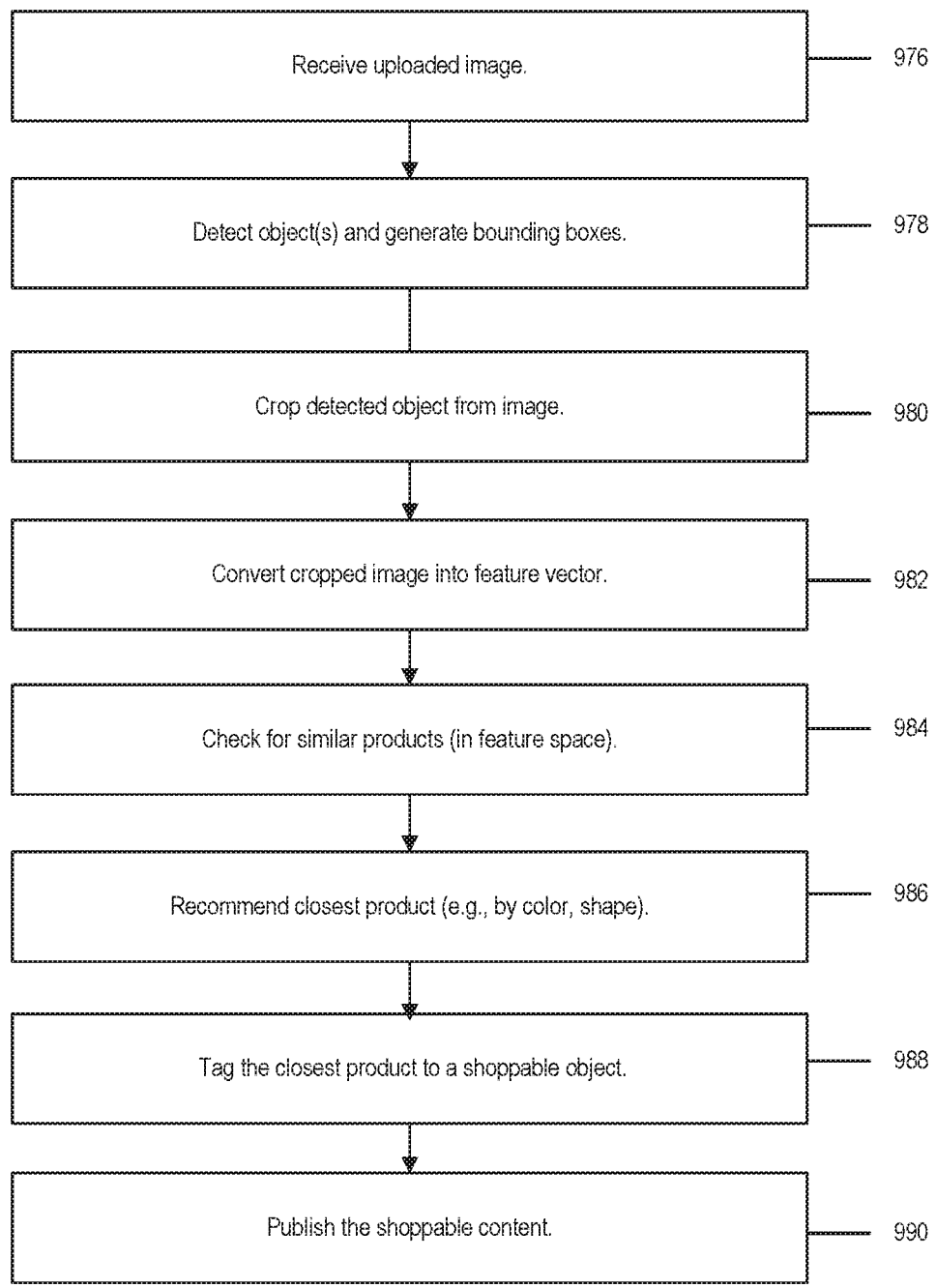
FIG. 21 illustrates a process used by a content creation tool to create shoppable content, in accordance with an embodiment.

FIG. 21 illustrates a process used by a content creation tool to create shoppable content, in accordance with an embodiment.

As illustrated in FIG. 21, in accordance with an embodiment, the process can include, at step 976, receiving an uploaded image; at step 978, detecting the object and generating bounding boxes; at step 980, cropping the object from the image; at step 982, converting the cropped image into a feature vector; at step 984, checking for similar products in a feature space; at step 986, recommending a closest product (e.g., by color, or shape); at step 988, tagging the closest product to a shoppable object; and at step 990, publishing the shoppable content.

Embodiments described herein can be implemented using one or more general purpose or specialized digital computer, computing device, machine, or microprocessor, or other type of computer, including one or more processors, memory and/or computer-readable storage media programmed according to the teachings of the present disclosure. Appropriate software coding can readily be prepared by skilled programmers based on the teachings of the present disclosure, as will be apparent to those skilled in the software art.

In accordance with some embodiments, features described herein can be implemented, in whole or in part, in a cloud environment, as part of, or as a service of, a cloud computing system which enables on-demand network access to a shared pool of configurable computing resources (e.g., networks, servers, storage, applications, and services), and which can include characteristics, for example, as defined by the National Institute of Standards and Technology, such as, for example: on-demand self-service; broad network access; resource pooling; rapid elasticity; and measured service. Example cloud deployment models can include: public cloud, private cloud, and hybrid cloud; while example cloud service models can include Software as a Service (SaaS), Platform as a Service (PaaS), Database as a Service (DBaaS), and Infrastructure as a Service (IaaS). In accordance with an embodiment, unless otherwise specified, a cloud, as used herein, can encompass public cloud, private cloud, and hybrid cloud embodiments, and all cloud deployment models including, but not limited to, cloud SaaS, cloud DBaaS, cloud PaaS, and cloud IaaS.

In accordance with some embodiments, a computer program product can be provided which is a non-transitory computer-readable storage medium (media) having instructions stored thereon/in, which can be used to program a computer to perform any of the processes described herein. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing a content creation tool, including object detection within digital content or images, for use with shoppable content, comprising:

a content management system running on a computer comprising a processor and memory;

a content creation tool running within the content management system, wherein the content creation tool operates to:

automatically detect shoppable objects within a digital content based upon an object detection model trained on data associated with a user, the data associated with the user comprising images of products associated with the user, determine, via an application programming interface provided at the content management system that enables communication and data exchange between the content management system and a commerce provider repository, products at the commerce provider repository of the user to be mapped to the automatically detected shoppable objects, the commerce provider repository being provided at another computer comprising another processor and another memory, and create objects for use in publishing shoppable content in websites or other documents;

wherein the content creation tool, based upon automatically detecting a plurality of shoppable objects mapped to a plurality of products in a digital image, said automatically detecting the plurality of shoppable objects being based upon the object detection model trained on data associated with the user, determines a confidence score for each detected shoppable object and, upon each confidence score surpassing a threshold value, generates and displays a cropped bounding box around each of the automatically detected shoppable objects in the digital image, wherein the cropped bounding boxes are utilized in distinguishing the automatically detected shoppable objects from other portions of the digital image that are not automatically detected as shoppable objects based upon the object detection model trained on data associated with the user, and linking, via the application programming interface and to determine the availability for purchase thereof, products from the commerce provider repository with the plurality of shoppable objects detected in the digital image.

2. The system of claim 1, wherein the system automatically identifies products within each of one or more digital images using an object detection model trained on customer domain data associated with the commerce provider.

3. The system of claim 1 wherein the system generates feature vectors stored within a vector space data structure, corresponding to the shoppable objects detected in the digital image, based on image features identified within the cropped bounding box of the detected products.

4. The system of claim 1, wherein the system associates shoppable objects detected within digital images into vectors within a multi-dimensional vector space, and compares subsequently-received input digital content with product images, to find relevant product options within the products associated with the commerce provider.

5. The system of claim 4, wherein the content management system generates one or more image metadata attributes or tags based on products described within the content management system for each of the digital images.

6. The system of claim 5, wherein metadata information captured in the content management system is used to enrich original content, which metadata information is made available for search and discovery, including smart searching and sorting.

7. The system of claim 1, wherein the system includes a shoppable content JavaScript container or widget that generates image hyperlinks to image maps, including one or more clickable areas within the image, wherein each image map can link a shoppable object in the image that allows a user to add associated products directly to a user's shopping cart from a web page.

8. The system of claim 1,
wherein the content management system, via the server API, operates to request the commerce provider system to send data describing or defining a set of products offered for sale by the commerce provider; and wherein the content management system receives a list of the products, along with the data describing or defining the list of products.

9. The system of claim 1, wherein the system is provided as part of a cloud computing environment or is accessed through one or more cloud services.

10. A method for providing a content creation tool, including object detection within digital content or images, for use with shoppable content, comprising:
providing, at a computer comprising a microprocessor and a memory, a content management system; and
running a content creation tool within the content management system, wherein the content creation tool operates to:
automatically detect shoppable objects within a digital content based upon an object detection model trained on data associated with a user, the data associated with the user comprising images of products associated with the user,
determine, via an application programming interface provided at the content management system that enables communication and data exchange between the content management system and a commerce provider repository, products at the commerce provider repository of the user to be mapped to the automatically detected shoppable objects, the commerce provider repository being provided at another computer comprising another processor and another memory, and
create objects for use in publishing shoppable content in websites or other documents;
wherein the content creation tool, based upon automatically detecting the plurality of shoppable objects mapped to a plurality of products in a digital image, said automatically detecting a plurality of products being based upon the object detection model trained on data associated with the user, determines a confidence score for each detected shoppable object and, upon each confidence score surpassing a threshold value, generates and displays a cropped bounding box around each of the automatically detected shoppable objects in the digital image, wherein the cropped bounding boxes are utilized in distinguishing the automatically detected shoppable objects from other portions of the digital image that are not automatically detected as shoppable objects based upon the object detection model trained on data associated with the user, the data comprising images of products associated with the user, and linking, via the application programming interface and to determine the availability for purchase thereof, products from the commerce provider repository with the shoppable objects detected in the digital image.

11. The method of claim 10, further comprising automatically identifying products within each of one or more digital images using an object detection model trained on customer domain data associated with the commerce provider.

12. The method of claim 10, further comprising generating feature vectors stored within a vector space data structure, corresponding to the shoppable objects detected in the digital image, based on image features identified within the cropped bounding box of the detected products.

13. The method of claim 10, further comprising associating shoppable objects detected within digital images into vectors within a multi-dimensional vector space, and compares subsequently-received input digital content with product images, to find relevant product options within the products associated with the commerce provider.

14. The method of claim 10, wherein the content management system generates one or more image metadata attributes or tags based on products described within the content management system for each of the digital images.

15. The method of claim 10 wherein metadata information captured in the content management system is used to enrich original content, which metadata information is made available for search and discovery, including smart searching and sorting.

16. The method of claim 10, wherein the system includes a shoppable content JavaScript container or widget that generates image hyperlinks to image maps, including one or more clickable areas within the image, wherein each image map can link a shoppable object in the image that allows a user to add associated products directly to a user's shopping cart from a web page.

17. The method of claim 10, wherein a server API operates to provide access by the content management system to data stored at a commerce provider system;
wherein the content management system, via the server API, operates to request the commerce provider system to send data describing or defining a set of products offered for sale by the commerce provider; and wherein the content management system receives a list of the products, along with the data describing or defining the list of products.

18. A non-transitory computer readable storage medium having instructions thereon, which when read and executed by a computer cause the computer to perform steps comprising:
providing, at a computer comprising a microprocessor and a memory, a content management system; and
running a content creation tool within the content management system, wherein the content creation tool operates to:
automatically detect shoppable objects within a digital content based upon an object detection model trained on data associated with a user, the data associated with the user comprising images of products associated with the user,
determine, via an application programming interface provided at the content management system that enables communication and data exchange between the content management system and a commerce provider repository, products at the commerce provider repository of the user to be mapped to the automatically detected shoppable objects, the commerce provider repository being provided at another computer comprising another processor and another memory, and
create objects for use in publishing shoppable content in websites or other documents;
wherein the content creation tool, based upon automatically detecting the plurality of shoppable objects mapped to a plurality of products in a digital image, said automatically detecting a plurality of products being based upon the object detection model trained on data associated with the user, determines a confidence score for each detected shoppable object and, upon each confidence score surpassing a threshold value, generates and displays a cropped bounding box around each of the automatically detected shoppable objects in the digital image, wherein the cropped bounding boxes are utilized in distinguishing the automatically detected shoppable objects from other portions of the digital image that are not automatically detected as shoppable objects based upon the object detection model trained on data associated with the user, the data comprising images of products associated with the user, and linking, via the application programming interface and to determine the availability for purchase thereof, products from the commerce provider repository with the shoppable objects detected in the digital image.

* * * * *